United States Patent
Bookbinder et al.

(10) Patent No.: US 9,581,731 B2
(45) Date of Patent: Feb. 28, 2017

(54) ANTI-GLARE AND ANTI-SPARKLE TRANSPARENT STRUCTURES

(71) Applicant: CORNING INCORPORATED, Corning, NY (US)

(72) Inventors: Dana Craig Bookbinder, Corning, NY (US); Shandon Dee Hart, Corning, NY (US); Karl William Koch, III, Elmira, NY (US); James Andrew West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/413,158

(22) PCT Filed: May 31, 2013

(86) PCT No.: PCT/US2013/043682
§ 371 (c)(1),
(2) Date: Jan. 6, 2015

(87) PCT Pub. No.: WO2014/011328
PCT Pub. Date: Jan. 16, 2014

(65) Prior Publication Data
US 2015/0331149 A1 Nov. 19, 2015

Related U.S. Application Data

(60) Provisional application No. 61/669,305, filed on Jul. 9, 2012.

(51) Int. Cl.
*G02B 1/11* (2015.01)
*G02B 1/12* (2006.01)
(Continued)

(52) U.S. Cl.
CPC .............. *G02B 1/11* (2013.01); *G02B 1/12* (2013.01); *G02B 1/18* (2015.01); *G02B 5/021* (2013.01);
(Continued)

(58) Field of Classification Search
CPC . G02B 1/12; G02B 1/18; G02B 5/021; G02B 5/0221; G02B 2207/109; G02F 1/133502; G02F 2201/38
(Continued)

(56) References Cited

U.S. PATENT DOCUMENTS 6,117,508 A 9/2000 Parsonage et al.
6,778,240 B2 8/2004 Nakamura et al. ........... 349/112
(Continued)

FOREIGN PATENT DOCUMENTS

EP 1249716 A1 10/2002
JP 2003302506 10/2003 ............... G02B 5/02
(Continued)

OTHER PUBLICATIONS

M. Friz and F. Waibel, "Coating Materials" in Optical Interference Coatings, N. Kaiser and H.K. Pulker, ed. (*Springer*, 2003), pp. 105-130.
(Continued)

*Primary Examiner* — Bumsuk Won
*Assistant Examiner* — William R Alexander

(57) ABSTRACT

A distortion-reducing anti-glare (DRAG) structure is disclosed, wherein the DRAG structure includes first and second transparent mediums. The first transparent medium has a first refractive index and a first light-scattering anti-glare (AG) surface. The first AG surface by itself reduces glare but introduces an amount of distortion to the transmitted light. A second transparent medium having a second refractive index greater than the first refractive index is
(Continued)

selectively added to the first transparent medium to reduce the amount of distortion in the transmitted light.

18 Claims, 33 Drawing Sheets

(51) Int. Cl.
G02B 1/18 (2015.01)
G02B 5/02 (2006.01)
G02F 1/1335 (2006.01)

(52) U.S. Cl.
CPC ...... *G02B 5/0221* (2013.01); *G02B 2207/109* (2013.01); *G02F 1/133502* (2013.01); *G02F 2201/38* (2013.01)

(58) Field of Classification Search
USPC ............. 359/601, 487.02; 349/85; 428/448
See application file for complete search history.

(56) References Cited

U.S. PATENT DOCUMENTS

| | | | |
|---|---|---|---|
| 7,709,084 B2 | 5/2010 | Saito et al. | 428/323 |
| 7,939,160 B2 | 5/2011 | Furuya et al. | 428/141 |
| 7,960,021 B2 | 6/2011 | Im et al. | 428/327 |
| 7,960,029 B2 | 6/2011 | Kai et al. | 428/448 |
| 7,963,660 B2 | 6/2011 | Hamamoto et al. | 359/601 |
| 7,982,826 B2 | 7/2011 | Hirakata et al. | 349/85 |
| 2001/0035929 A1* | 11/2001 | Nakamura | G02B 1/11 349/137 |
| 2005/0237591 A1* | 10/2005 | Nakaho | B82Y 20/00 359/223.1 |
| 2006/0040204 A1 | 2/2006 | Nagahama et al. | |
| 2006/0132922 A1* | 6/2006 | Takao | G02B 1/10 359/601 |
| 2006/0159902 A1 | 7/2006 | Suzuki | 428/212 |
| 2006/0204718 A1 | 9/2006 | Kawakami | 428/141 |
| 2007/0184260 A1 | 8/2007 | Saito et al. | |
| 2008/0247045 A1 | 10/2008 | Suzuki et al. | |
| 2008/0286527 A1 | 11/2008 | Haga et al. | |
| 2009/0246415 A1 | 10/2009 | Horie et al. | 428/1.3 |
| 2010/0080893 A1 | 4/2010 | Inoue et al. | |
| 2010/0195311 A1 | 8/2010 | Furui et al. | 362/97.1 |
| 2010/0231830 A1* | 9/2010 | Hirakata | G02B 1/105 349/85 |
| 2010/0238384 A1 | 9/2010 | Tochigi et al. | |
| 2011/0062849 A1 | 3/2011 | Carlson et al. | |
| 2011/0177240 A1 | 7/2011 | Saiki et al. | 427/162 |
| 2011/0286222 A1 | 11/2011 | Coleman | 362/326 |
| 2012/0140323 A1 | 6/2012 | Yajima et al. | 359/487.02 |
| 2012/0218640 A1 | 8/2012 | Gollier et al. | |
| 2012/0300304 A1 | 11/2012 | Gollier et al. | |
| 2012/0300307 A1 | 11/2012 | Borrelli et al. | |

FOREIGN PATENT DOCUMENTS

| | | | |
|---|---|---|---|
| JP | 2006078710 A | 3/2006 | |
| JP | 2006113098 | 4/2006 | G03B 21/62 |
| JP | 2006145587 A | 6/2006 | |
| JP | 2007333948 | 12/2007 | C03B 21/60 |
| JP | 2008189836 A | 8/2008 | |
| JP | 2008233870 A | 10/2008 | |
| JP | 2009175380 | 8/2009 | G02B 5/20 |
| JP | 04581927 | 9/2010 | G01M 11/00 |
| JP | 4581927 B2 | 11/2010 | |
| JP | 2012063579 | 3/2012 | G02B 5/02 |
| WO | WO2011/034898 | 3/2011 | C03C 15/00 |
| WO | WO2011/137141 | 11/2011 | C03C 15/00 |
| WO | WO2011/137144 | 11/2011 | C03C 17/00 |

OTHER PUBLICATIONS

Gliemann, et al., "Nanostructure formation inpolymer thin films influenced by humidity," Surface and Interface Analysis 39, No. 1 (2007): 1-8k.
INM Information Laboratory Technology; "High Index TiO2 Coatings on Plastic Substrates"; 2 pages; http://www.solgel.com/labfoc/inm/tio2_e.html.
Schmidt Corrector Plate; Wikipedia; 3 pages; http://en.wikipedia.org/wiki/Schmidt_corrector_plate.
Schmidt et al; "Wet Coating Technologies for Glass"; The Sol-Gel Gateway; Nov. 2000; 15 pages; http://www.solgel.com/articles/Nov00/mennig.htm.
Sigma-Aldrich; "Materials for High and Low Refractive Index Coating"; Organic and Printed Electronics; 3 pages; http://www.sigmaaldrich.com/materials-science/organic-electronics/ri-coatings.html.
Silviera, et al., "Phase separation in PMMA/silica sol-gel systems," Polymer 36, No. 7 (1995): 1425-1434.
English Translation of JP2015-521618 Second Office Action Dated Nov. 8, 2016; 4 pages; Japanese Patent Office.

* cited by examiner

ANTI-GLARE AND ANTI-SPARKLE TRANSPARENT STRUCTURES

RELATED APPLICATIONS

The present application is co-pending with and claims the benefit of priority under 35 U.S.C. §371 of International Application PCT/US13/43682 filed May 31, 2013 which claims the priority benefit of the provisional application entitled "Anti-glare and anti-sparkle transparent structures with reduced optical distortion," Application Ser. No. 61/669,305, filed on Jul. 9, 2012, the entirety of each are incorporated herein by reference.

FIELD

The present disclosure relates to anti-glare and anti-sparkle transparent structures, and in particular relates to such structures having reduced optical distortion.

BACKGROUND

There are numerous devices, applications and situations in which one needs to view an object through an intervening transparent medium. For example, most cell phones, computer displays, televisions and appliances employ displays that include a top transparent sheet as the transparent medium through which the displayed information or picture is viewed. Likewise, windows, windshields, glass for covering photographs and other artwork, aquariums and the like involve viewing an object through an intervening transparent medium.

A common problem that arises when viewing an object through an intervening transparent medium is glare. Glare may be defined as the substantially specular reflection of ambient light on the viewer side of the transparent medium from one or more surfaces of the transparent medium. Thus, glare light travels an optical path that extends from the source of the ambient light to the surface of the transparent medium and then to the viewer, with the angle of incidence being substantially the same as the angle of reflection. Object light, on the other hand, travels from the object through the transparent medium to the viewer. Glare makes it difficult to view an object through the intervening transparent medium when the optical paths of the glare light and the object light substantially overlap in the region between the transparent medium and the viewer.

Consequently, anti-glare surfaces are often applied to the viewer-side surface of the transparent medium to avoid or reduce the amount of glare. Such anti-glare surfaces are typically formed by providing some degree of roughness that spreads (i.e., scatters or diffuses) the light reflected by the surface over a certain angle. Typical anti-glare surfaces used in display applications comprise a coated or structured polymeric film (often a polarizing film) that is directly laminated to the surface of the front glass sheet forming the display (e.g., a liquid-crystal display (LCD)). The ideal parameters and processes used for anti-glare polymeric coatings are not necessarily the same as the ideal parameters used for a protective anti-glare cover glass. One reason for this is the anti-glare surface on a protective cover glass typically must be placed at a larger optical distance from the image-forming plane of the display device than would an anti-glare polymeric coating.

Random noise may be generated in an image viewed through such an anti-glare surface due to either excessive roughness or the shape of the features that form the roughened surface. Such noise is generally called "sparkle" or "dazzle" and may be characterized by a number referred to as the pixel power deviation (PPD). Sparkle may occur when anti-glare or light-scattering surfaces are employed on the surface of a transparent medium. Sparkle is associated with a very fine, grainy appearance that appears to shift as the viewing angle changes. This type of sparkle is observed, for example, when pixelated displays such as LCDs are viewed through an anti-glare surface. "Sparkle," as the term is used herein, is of a different type and origin than "speckle," which is an interference effect that arises in connection with rough surfaces illuminated by coherent light.

A major shortcoming of anti-glare and anti-sparkle surfaces is when applied to an intervening transparent medium disposed between the user and the object, they distort the optical path of the transmitted light. For example, conventional anti-glare and anti-sparkle surfaces relying on surface roughness tend to diffuse the object light, which makes the object look diffuse and thus less clear. The farther the object is located from the transparent medium, the more distorted the object appears when viewed through the transparent medium. Thus, there is a need for anti-glare and anti-sparkle surfaces having reduced optical distortion for object light when applied to a transparent medium.

A related application for embodiments of the present disclosure is the use of roughened surfaces on touch screens or other touch-sensitive surfaces through which light is transmitted. These may often be used to improve the "gliding feel" of fingers, styluses, or other probes over a touch screen surface. This may be accomplished through adding surface roughness, which reduces the effective contact area between probe and screen, thus reducing the effective friction or stick-slip effects, and providing a pleasing touch interface. These rough surfaces, while not used strictly to create an anti-glare effect, typically also will create the same problems as described above, such as distortion or sparkle effects for transmitted light. Thus, a related aspect of this disclosure is to create roughened surfaces to enhance touch screen or touch-sensitive-surface usability through reducing effective friction or creating an engineered friction surface, while at the same time minimizing negative optical effects imparted to the transmitted light.

SUMMARY

Some embodiments of the present disclosure provide an anti-glare light-transmitting structure that reduces an amount of glare from reflected ambient light and that has reduced optical distortion for light of wavelength $\lambda$ transmitted through the light-transmitting structure. Such an exemplary structure includes a first transparent medium having a first refractive index $n_1$ and a light-scattering first surface that reduce glares and that by itself introduces an amount of distortion to the transmitted light, and a second transparent medium having a second refractive index $n_2$ and a second surface that defines an interface to an ambient environment having a refractive index $n_3$ whereby $n_2 > n_1 > n_3$ and the second transparent medium residing atop of and at least partially covering the first surface to reduce the amount of distortion introduced by the first surface.

Additional embodiments of the present disclosure provide an anti-glare light-transmitting structure that reduces an amount of glare from reflected ambient light and that has reduced optical distortion of light of wavelength $\lambda$ transmitted through the light-transmitting structure. An exemplary structure includes a first transparent medium having a first refractive index $n_1$ and a first surface that defines an interface to an ambient environment having a refractive index $n_3$, whereby the first surface constitutes a light-scattering anti-glare surface that introduces an amount distortion to the transmitted light. The structure also includes a plurality of ion-diffused regions of refractive index $n_2 > n_1 > n_3$ formed in the first transparent medium that serve to reduce the amount of distortion in the transmitted light.

A further embodiment of the present disclosure provides a method of forming an anti-glare light-transmitting structure that reduces an amount of glare from reflected ambient light and that has reduced optical distortion of light of wavelength λ transmitted through the light-transmitting structure. The method includes forming, on a first transparent medium having a first refractive index $n_1$, a light-scattering anti-glare first surface that by itself introduces an amount of distortion to the transmitted light. The method also includes adding a second transparent medium to the first surface of the first transparent medium, the second transparent medium having a second refractive index $n_2$ and a second surface that interfaces with an ambient environment having a refractive index $n_3$, whereby $n_2 > n_1 > n_3$, with the second transparent medium covering at least a portion of the first surface to reduce the amount of distortion in the transmitted light.

Another embodiment of the present disclosure includes a method of forming an anti-glare light-transmitting structure that reduces an amount of glare from reflected ambient light and that has reduced optical distortion of light of wavelength λ transmitted through the light-transmitting structure. The method may include forming a transparent medium having a first refractive index $n_1$ and a light-scattering anti-glare first surface having peaks and valleys that by itself introduces an amount of distortion to the transmitted light. The method may also include adding ion-diffused regions to the first transparent medium, the ion-diffused regions having a second refractive index $n_2$ and a second surface that interfaces with an ambient environment having a refractive index $n_3$, whereby $n_2 > n_1 > n_3$, with the ion-diffused regions formed in the valleys and configured to reduce the amount of distortion in the transmitted light.

It is to be understood that both the foregoing general description and the following Detailed Description represent embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure and together with the description serve to explain the principles and operations of the disclosure.

Figure 1:
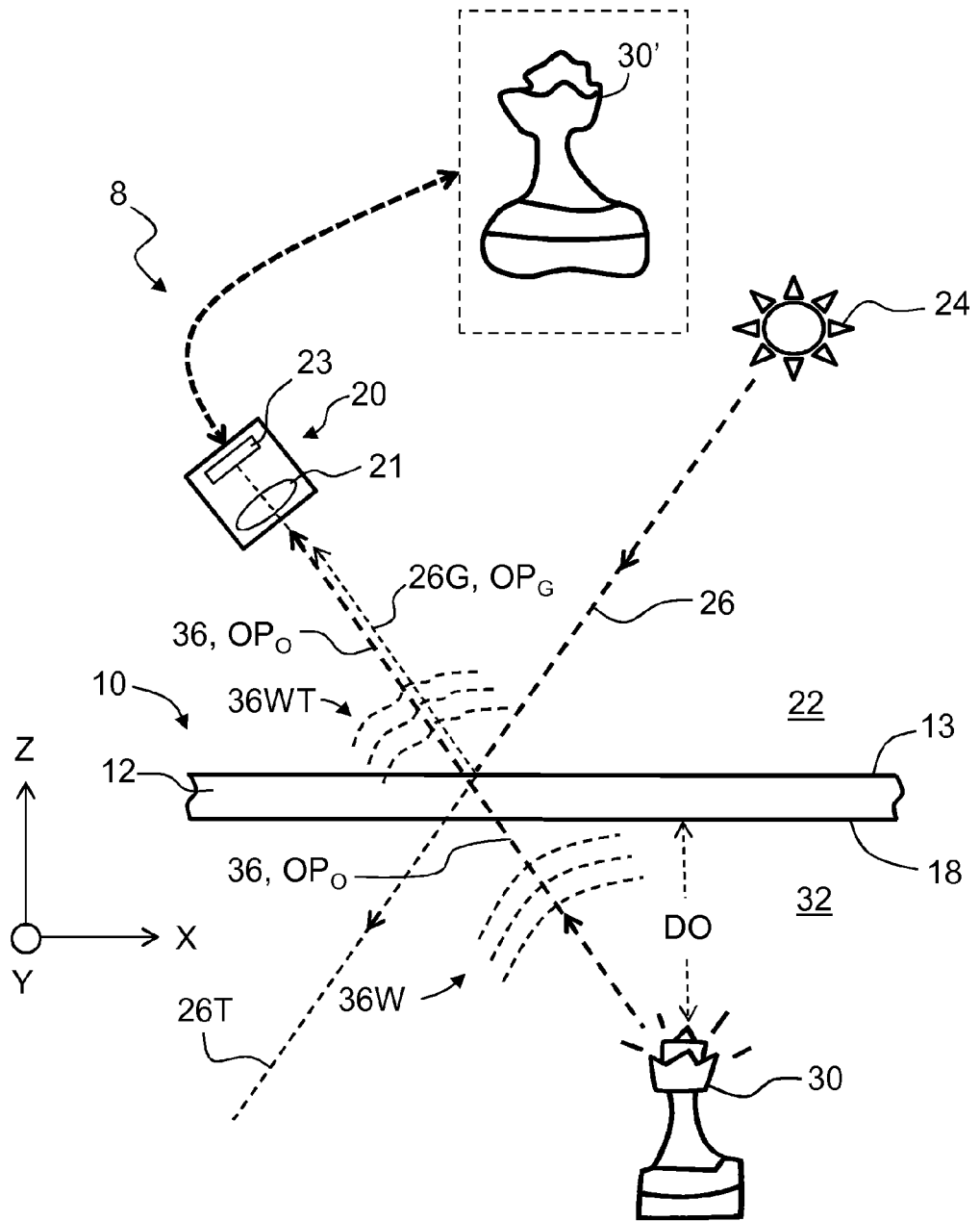
FIG. 1 is an illustration of an exemplary configuration of an imaging system that includes a transparent medium having a conventional anti-glare (AG) surface.

Additional features and advantages of the disclosure are set forth in the Detailed Description that follows and will be apparent to those skilled in the art from the description or recognized by practicing the disclosure as described herein, together with the claims and appended drawings. It will be understood that the illustrations are for the purpose of describing particular embodiments and are not intended to limit the disclosure or in the appended claims. The claims as set forth below are incorporated into and constitute part of the Detailed Description. The drawings are not necessarily to scale, and certain features and certain views of the drawings may be shown exaggerated in scale or in schematic in the interest of clarity and conciseness. Cartesian coordinates are shown in certain of the Figures for the sake of reference and are not intended as limiting with respect to direction or orientation. All references cited herein are incorporated by reference herein in their entirely.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and may include modification thereto and permutations thereof.

The term "transparent medium" means a medium that is substantially transparent to a given wavelength of light.

As used herein, an anti-glare (AG) surface differs from an anti-reflection (AR) surface. For example, instead of reducing the magnitude of the reflections, an AG surface keeps substantially the same magnitude of reflection but scrambles the information content of the reflected image. This is accomplished by the creation of a slightly roughened surface that redistributes the specular reflection over a broader range of angles. Typically this produces a matte finish on the treated surface and may reduce image contrast under ambient lighting. Fingerprints and surface contamination are not as visible on AG surfaces as they are on non-AG surfaces, and there is no color imparted to the transmitted light and no problem with angular dependence of the reflection spectrum. As compared to prior art AG and anti-sparkle (AS) transparent surfaces, the AG surfaces described herein allow for a reduced optical distortion (or substantially no optical distortion) when an object is viewed through the transparent medium that includes the AG surface.

AR coatings may be used in connection with distortion-reducing anti-glare (DRAG) structures disclosed herein or otherwise. Exemplary AR coatings are deposited in such a way that optical reflections from the interfaces sum destructively to substantially cancel reflections that would be seen by a viewer. AR coatings may also include nano-structured "moth-eye" surfaces made from sub-wavelength surface elements that do not substantially modify the optical path of reflected light, although they modify the amplitude of reflected light. The light angle of incidence is substantially the same as the angle of reflection with AR coatings.

Such AR coatings may be a single, uniform layer of a prescribed refractive index and thickness, a gradient index layer, a nanostructured layer, a nanoporous layer, or multiple layers and may be deposited directly on the front element of the display or may be added as a laminated premade film. AR coatings may greatly reduce the front surface reflections, but these weaker reflections are specular and retain the detail of the reflected image. An AR coating does not impact the quality of the transmitted image. As described later, AR coatings or surfaces of any type may be beneficially combined with the anti-glare surfaces of the present disclosure.

Other aspects of the present disclosure are directed to anti-sparkle (AS) surfaces. Sparkle is associated with a very fine, grainy appearance of the surface of a transparent medium, and may cause the pattern of the grains to appear to shift with changing viewing angles. Display sparkle may manifest as bright and dark or colored spots at approximately the pixel level of a display, for example.

In an example, the size of an overall transparent medium (i.e., window, display, etc.), is >4 cm$^2$, in some embodiments >25 cm$^2$, in other embodiments >100 cm$^2$, and in yet other embodiments >1 m$^2$. A transparent medium includes objects made of glass, glass-ceramic and/or polymers. A transparent medium used in the visible wavelength of light (400-700 nm) is most important for the human eye. Having a transparent medium used at other wavelengths including the UV and IR wavelengths may be important for instruments (e.g., cameras or imaging systems) used at those wavelengths.

The term "optical distortion" as used herein means any deviation of light rays (or wavefronts) arising from an object from their ideal optical path (or in the case of wavefronts, ideal shape) associated with forming an ideal image of the object at a viewing optical system, wherein the deviation arises from phase errors reducing the quality of the image as formed by the viewing optical system. A conventional AG surface makes no accommodation for optical distortion, with the result being that an object viewed through the surface appears distorted. In the discussion below, an optical path difference $\Delta$OPD between transmitted wavefronts and incident wavefronts (i.e., the wavefronts prior to their transmission by the transparent medium supporting the AG surface(s)) is used by way of example to quantify the amount of distortion.

Another method of quantifying the amount of optical distortion is by the displacement of points in an image from their ideal or undistorted locations. Exemplary optical distortions include barrel and pin-cushion distortion. In the discussion below, in example embodiments, the amount of optical distortion in the image of an object as formed by an optical system may be better than 20%, better than 10%, better than 5% or better than 2%.

The DRAG structures disclosed herein have a wide range of applications, including front surfaces of or buried interfaces within any display, protective covers for light-emitting displays of any size, touch screens, touch-sensitive surfaces, liquid-crystal displays (LCDs), organic light-emitting diodes (OLEDs), heads-up displays, laser based reflective heads-up displays, windows (for vehicles, housings, buildings, appliances, display cases, picture frames, freezers, refrigerators etc.), vehicle dashboards, vehicle visors, vehicle hoods, vehicle doors, sunglasses, or a glasses-based display, and generally for any application where an observer or optical system needs to view a scene or object through a transparent medium and where ambient light is present on the side where the observer or optical system resides.

FIG. 1 is an illustration of an exemplary configuration of an imaging system that includes a transparent medium having a conventional anti-glare (AG) surface. With reference to FIG. 1, the transparent medium 10 is shown by way of example as a transparent sheet having a body 12 with a conventional anti-glare (AG) upper surface 13 and a substantially planar lower surface 18 that is parallel to the upper surface. Generally, the transparent medium 10 may have an arbitrary shape.

The transparent medium 10 resides between a viewing optical system 20 in a viewing space 22 and an object 30 in an object space 32. The object 30 is nominally a distance DO from transparent medium 10. The viewing space 22 includes a source 24 of ambient light 26. A portion of ambient light 26 travels over a glare optical path OP$_G$ that includes a reflection of a certain amount of the ambient light from conventional AG upper surface 13 of transparent medium 10. The reflection of ambient light 26 by the transparent medium 10 forms reflected ambient light 26G, which registers as glare to viewing optical system 20 and so is referred to hereinafter as glare light 26G. A portion 26T of ambient light 26 is transmitted through transparent medium 10 into object space 32. Note that the refraction of light 26T and other light traveling through transparent medium 10 is ignored in FIG. 1 for ease of illustration.

An exemplary viewing optical system 20 includes an imaging lens 21 and an image sensor (e.g., a photodetector) 23 upon which an image from the imaging lens 21 is formed. An example viewing optical system 20 is the human eye (or eyes) of a viewer. The viewing optical system 20 views object 30 over an object optical path OP$_O$ over which light 36 from object 30 travels. The object optical path OP$_O$ passes through transparent medium 10. Wavefronts 36W associated with object light 36 from the object 30 thus travel over the portion of object optical path OP$_O$ in viewing space 22, where object optical path OP$_O$ overlaps the reflected portion of glare optical path OP$_G$ that is directed to viewing optical system 20. The wavefronts transmitted through transparent medium 10 and that reach viewing optical system 20 are denoted 36WT.

The conventional AG surface 13 of FIG. 1 is configured to reduce or eliminate the amount of specular glare light 26G reaching the viewing optical system 20; therefore, the reflected specular portion of glare optical path OP$_G$ is shown as being attenuated (through optical scattering), as indicated by the transition from the heavier dotted line to the lighter dashed line. However, for the case of the conventional AG surface 13, the transmitted wavefronts 36WT are distorted as compared to the original object wavefronts 36W. This distortion arises because the phase of transmitted wavefronts 36WT is substantially altered by the AG surface 13. The result is that the viewing optical system 20 sees a distorted object 30, i.e., forms a distorted image, such as the exemplary image 30' shown in the inset of FIG. 1. So with the conventional AG surface 13, the reduction in glare comes at the expense of the clarity with which object 30 may be viewed or imaged.

Distortion-Reducing Anti-Glare (DRAG) Structure

Figure 2:
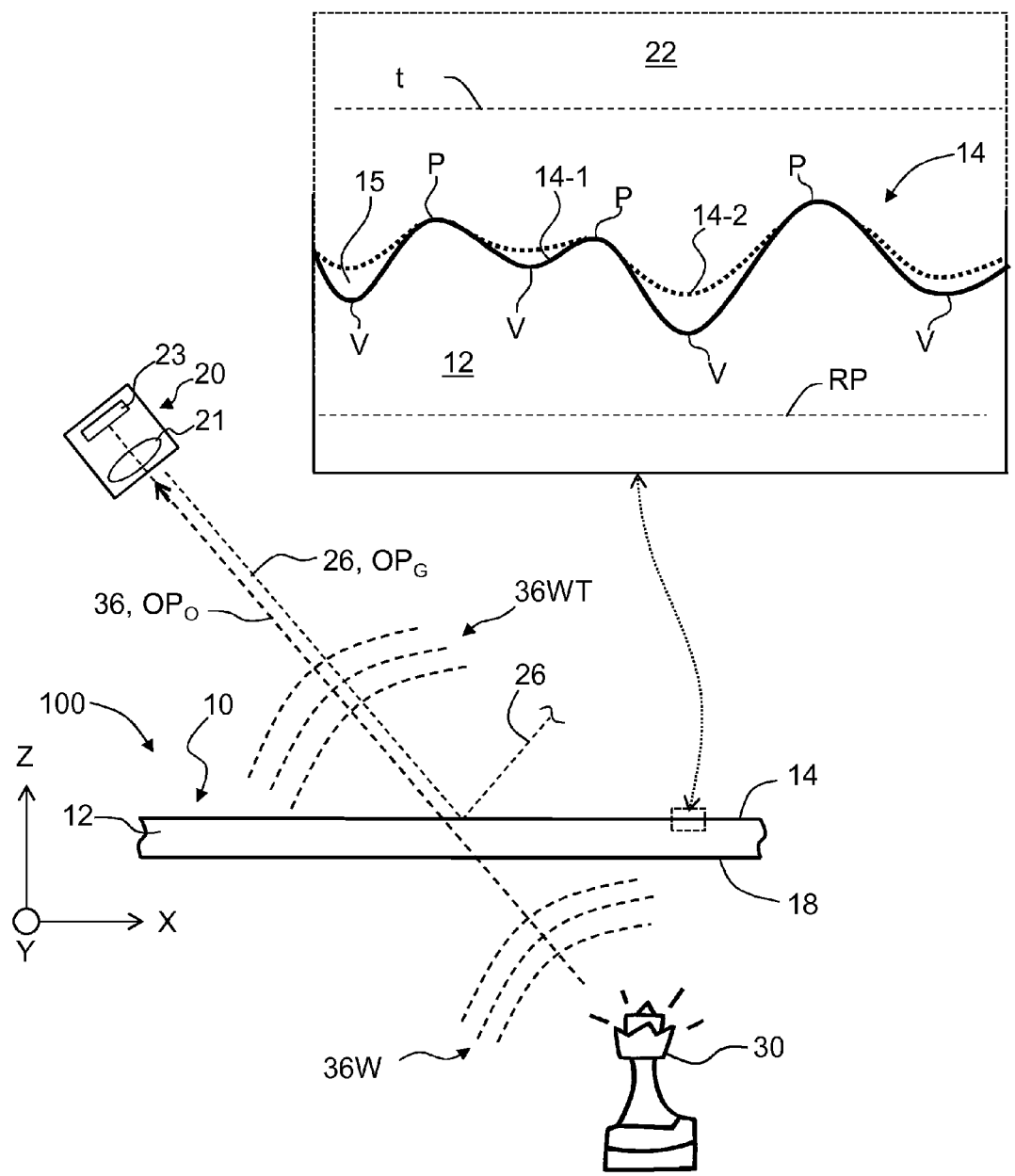
FIG. 2 is an illustration of an exemplary configuration of an imaging system that includes a transparent medium having a distortion-reducing anti-glare (DRAG) structure according to the present disclosure and close-up inset thereof.

FIG. 2 is an illustration of an exemplary configuration of an imaging system that includes a transparent medium having a distortion-reducing anti-glare (DRAG) structure according to the present disclosure and close-up inset thereof. With reference to FIG. 2, the AG surface 14 is configured to reduce or eliminate the amount of glare light 26G reaching the viewing optical system 20 while also reducing or minimizing the amount of optical distortion in transmitted wavefronts 36WT by substantially preserving the phase of original wavefronts 36W. This is indicated schematically by transmitted wavefronts 36WT being substantially the same as original wavefronts 36W leaving the object 30. Thus, the AG surface 14 allows the viewing optical system 20 to see the object 30 with reduced or minimum optical distortion while also reducing glare. Thus, the clarity with which the object 30 may be viewed is not sacrificed and glare is reduced. As used herein, the term "AG surface" may include one or more layers and one or more interfaces.

For example, the phase difference between the transmitted wavefronts 36WT and the original wavefronts 36W (i.e., the optical path difference or ΔOPD) is ½λ ("half of a wave") or less, or ¼λ or less, or ⅛λ or less. That is, the light-transmitting structure where the relative phase difference is defined by an optical path difference (ΔOPL) where in some embodiments, ΔOPL≤½λ, in some other embodiments ΔOPL≤¼λ, and in yet other embodiments ΔOPL≤⅛λ, and where λ represents a wavelength of the transmitted light. Assuming the optical system 20 has essentially perfect imaging properties and that transparent medium 10 with AG surface 14 acts as a potentially aberration-inducing element in the system, these amounts of ΔOPD respectively correspond to a Strehl ratio for optical system 20 of 0.4, 0.8 and 0.95.

FIG. 2 includes an inset that shows a close-up side view of a particular exemplary AG surface 14. The exemplary AG surface 14 of the inset has a first surface 14-1 defined by body 12 and a first surface shape $h_1(x)$, or more generally $h_1(x,y)$ for two dimensions. In a non-limiting example, the first surface 14-1 may have a random shape, i.e., defining a random surface roughness. The first surface 14-1 may also have peaks P and valleys V. This surface roughness contributes to the primary anti-glare effect, and so although the surface roughness is not particularly limited, it may be optimized to achieve certain desirable reflective effects. For example, the roughness of surface 14-1 may be random, or it may be semi-random, or it may have repeating or partially repeating primary structures such as hemispheres, prisms, gratings, retro-reflecting cube corners, or pseudo-random "binary" surfaces (as will be described later). Also, the surface 14-1 may be a semi-random AG surface with engineered lateral spatial frequency content as described in U.S. Patent Application Publications No. US2011/0062849 A1; US2012/0218640 A1; and US2012/0300304 A1, the entirety of each incorporated herein by reference.

The exemplary AG surface 14 may also include a transparent layer 15 residing immediately adjacent the first surface 14-1 and that defines a second surface 14-2 having a second surface shape $h_2(x)$, or more generally $h_2(x,y)$ for two dimensions. In a non-limiting example, the transparent layer 15 is formed by a coating of a transparent material configured to reduce optical distortion and so is herein referred to as an optical distortion-reducing layer 15. The structure formed by the transparent medium 10 and optical distortion-reducing layer 15 constitutes a distortion-reducing anti-glare (DRAG) transparent structure 100. Examples of the first and second surface shapes $h_1(x,y)$ and $h_2(x,y)$ of first surface 14-1 and second surface 14-2, respectively, are described in greater detail below.

Second Surface Shape

As discussed above, wavefronts 36W associated with object light 36 travel over object optical path $OP_O$ from the object 30 to the viewing optical system 20 through the transparent medium 10 and form transmitted wavefronts 36WT. Optical distortion in transmitted wavefronts 36WT may arise from phase variations imparted by an uneven upper surface 14, such as is formed by first surface 14-1 alone. An exemplary imaging lens 21 has a well-defined phase relationship between all parts of the image at any point along object optical path $OP_O$. A conventional AG surface 13 adds a spatially dependent random phase term to wavefronts 36W that distorts the image formed by the viewing optical system 20, i.e., forms distorted transmitted wavefronts 36WT (FIG. 1).

In an exemplary embodiment, the AG surface 14 of the present disclosure is configured to add a compensating phase term via an optical distortion-reducing layer 15, which acts to reduce or eliminate the usual optical distortion for object light associated with conventional AG surfaces 13, thereby enabling viewing optical system 20 to form a more accurate image of object 30. At the same time, a DRAG surface 14 of the present disclosure substantially preserves the anti-glare effect for glare light 26G.

Mathematical Basis for AG Surface with Reduced Optical Distortion

The image optical distortion caused by the AG surface 14 may be described using a Fourier optics model that propagates wavefronts 36W through transparent medium 10. The model describes the AG surface 14 as having an optical phase $\phi(x,y)$. For an AG surface 14 having a first surface 14-1, the electric fields E associated with the propagation of wavefronts 36W may be approximated by the expression:

$$E_{after} = E_{before}\, e^{i\phi(x,y)} = E_{before} e^{i\frac{2\pi}{\lambda}\cdot[n_1 h_1(x,y)+n_3(t-h_1(x,y))]}, \quad \text{Eq. 1}$$

where $E_{before}$ represents the electric field just before rough surface 14-1, $E_{after}$ represents the electric field just after the rough surface, $n_1$ and $n_3$ represent the refractive indices on either side of the rough surface, λ represents the wavelength of object light 36, t represents a constant reference plane, and $h_1(x,y)$ represents the aforementioned height profile of the surface roughness for the first surface.

A reference plane RP or t (see inset, FIG. 2) may be used to provide a reference for the phase and a location from which $h_1(x,y)$ and $h_2(x,y)$ may be measured. The location of reference planes RP and t are arbitrary, provided that both are located at some distance before or after (i.e., above or below) the rough surface, as spatially invariant phase terms will not lead to image distortion. For example, to conceptually describe one situation in Eq. 1, reference plane RP may lie below the rough surface, $h_1(x,y)$ and $h_2(x,y)$ may have positive values referenced to RP, and reference plane t may lie above the rough surface and be used to define a distance of air space above the rough surface as in Eq. 1. To eliminate image optical distortion, it is required that $\phi(x,y)$ =constant=$\phi_0$, which in turn implies that if a second surface 14-2 is not present, then either $h_1$=constant (i.e., there is a smooth surface) or $n_1=n_3$ (i.e., there is no surface).

However, in the case where optical distortion-reducing layer 15 is present so that a second surface 14-2 is present, when body 12 of transparent medium has index $n_1$, transparent layer 14-2 has a refractive index $n_2$, and viewing space 22, which resides adjacent the transparent layer, constitutes a medium having a refractive index $n_3$, and when the condition $n_3<n_1<n_2$ is satisfied, it follows that:

$$E_{after} = E_{before}\, e^{i\phi(x,y)} = E_{before} e^{i\frac{2\pi}{\lambda}\cdot[n_1 h_1(x,y)+n_2(h_2(x,y)-h_1(x,y))n_3(t-h_2(x,y))]} \quad \text{Eq. 2}$$

The requirement that $\phi(x,y)$=constant=coo for optical-distortion-free imaging allows one to solve Eq. 2 for the second surface shape $h_2(x,y)$ in terms of the first surface shape $h_1(x,y)$:

$$\varphi(x, y) = \quad \text{Eq. 3}$$

$$\frac{2\pi}{\lambda}\{n_1 h_1(x, y) + n_2(h_2(x, y) - h_1(x, y)) + n_3(t - h_2(x, y))\} = const$$

$$(n_1 - n_2)h_1(x, y) - (n_3 - n_2)h_2(x, y) = const - n_3 t$$

$$\therefore h_2(x, y) = \frac{(n_2 - n_1)}{(n_2 - n_3)} h_1(x, y) + c$$

The second surface shape $h_2(x,y)$ is thus a scaled version of the first surface shape $h_1(x,y)$ via the relationship $h_2(x,y)=\psi \cdot h_1(x,y)$, wherein the scaling factor is $$\psi = (n_2 - n_1)/(n_2 - n_3),$$

and c represents an arbitrary constant. To satisfy the physical condition that $h_2(x,y)$ is everywhere greater than or equal to $h_1(x,y)$, it is necessary to specify a minimum value for the constant c:

$$c \geq \frac{(n_1 - n_3)}{(n_2 - n_3)}(h_1(\max)) \quad \text{Eq. 4}$$

where $h_1(\max)$ represents a constant for a given structure, equal to the global maximum height of surface shape $h_1(x,y)$. When the constant c is precisely equal to the above minimum value term $(n_1-n_3)/(n_2-n_3)\cdot(h_1(\max))$ in Eq. 4, this corresponds to the special case where $h_2=h_1$ at the peak locations of $h_1(x,y)$ (at the spatial locations where $h_1(x,y)=h_1(\max)$).

Physically, this is the special case illustrated in many of the previous and following drawings and examples, where the peaks of $h_1(x,y)$ do not have any additional coating material on top of them. It is also noted that c may be greater than the minimum value term in Eq. 4 which only adds a constant offset to the optical path length at every location across the surface of the structure.

The end result is that material making up optical distortion-reducing coating layer 15 partially fills valleys V of the first surface 14-1, with the thickness of the coating layer depending upon the depth and shape of each of the valleys. The lower the refractive index $n_2$ that makes up coating layer 15, the thicker the coating layer needs to be in the valleys V. Thus, an optical distortion-reducing layer 15 may be thought of as forming a quasi-conformal layer atop the first surface 14-1.

When the condition $n_3<n_1<n_2$ for the AG surface 14 is satisfied, the scaling factor $\psi$ is less than 1, which makes the root-mean-square (RMS) surface roughness of second surface 14-2 less than the RMS of underlying first surface 14-1. This is the situation illustrated in the inset of FIG. 2, where valleys of the structure are partially filled with high-index material having an index $n_2$. The presence of a higher-index medium at AG surface 14 will lead to somewhat different reflection and transmission-haze properties. These modified AG properties may be accounted for in the design of the AG surface 14.

For example, the light-transmitting structure having the first AG surface is defined by the first surface 14-1 of the transparent medium 10 and has a first surface shape $h_1(x,y)$, an optical-distortion-reducing layer 15 residing immediately adjacent the first surface and having a refractive index $n_2>n_1$ and that defines a second surface 14-2 having a second surface shape $h_1(x,y)$, and a medium immediately adjacent the second surface opposite the first surface and having a refractive index $n_3$ where $n_3<n_1$, and where $(n_2-n_1)/(n_2-n_3)\cdot h_1(x,y) \leq h_2 \leq 0.5((n_2-n_1)/(n_2-n_3)\cdot h_1(x,y))$.

That is, where $h_2$ is within 50% of $(n_2-n_1)/(n_2-n_3)\cdot h_1(x,y)$. In other embodiments it is preferred that $(n_2-n_1)/(n_2-n_3)\cdot h_1(x,y) \leq h_2 \leq 0.8((n_2-n_1)/(n_2-n_3)\cdot h_1(x,y))$. That is, where $h_2$ is within 80% of $(n_2-n_1)/(n_2\cdot n_3)\cdot h_1(x,y)$.

In the alternate condition $n_3<n_2<n_1$ (with low-index material with $n_2$ filling the valleys of the first surface shape $h_1(x,y)$), Eqs. 3 and 4 above still apply, but it may be necessary to apply the minimum constant value in Eq. 4, which will generate peaks of the second surface shape $h_2(x,y)$ that rise to a higher amplitude than the peaks of $h_1(x,y)$. In this special case, the peaks of $h_2(x,y)$ will generally reside above the valleys of $h_1(x,y)$. Since $h_2(x,y)$ is everywhere greater than or equal to $h_1(x,y)$, the peaks of $h_2(x,y)$ correspond to the global peaks of the structure.

Figure 3A:
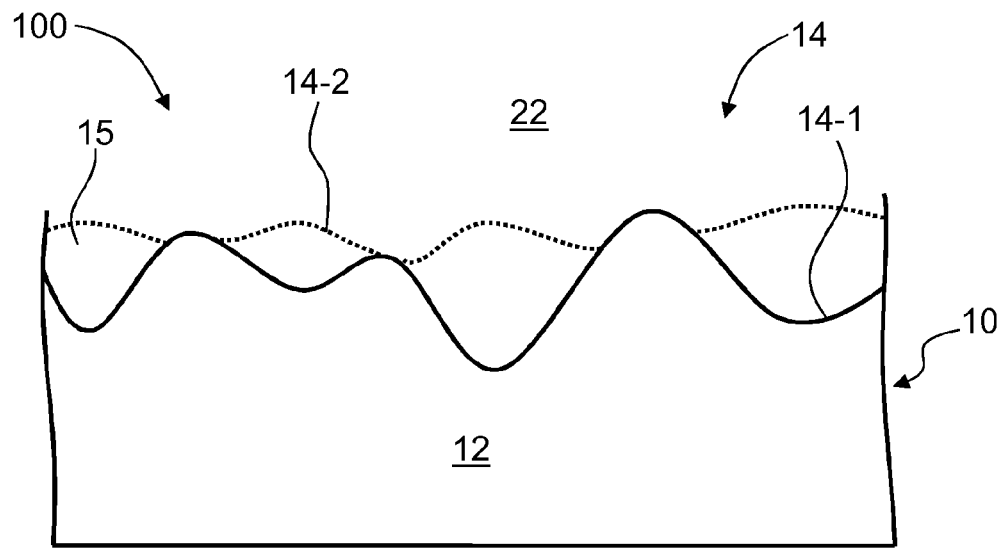
FIG. 3A is a plot showing a close-up inset view of FIG. 2 with an exemplary DRAG structure for the case $n_3 < n_2 < n_1$.
Figure 3B:
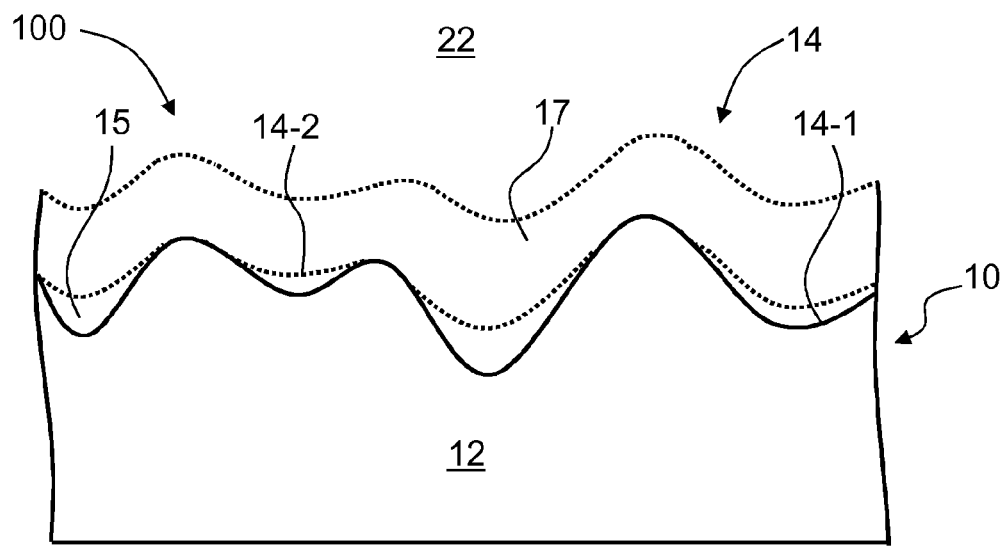
FIG. 3B is a plot showing a close-up inset view of FIG. 2 including an anti-reflection (AR) layer atop the distortion-reducing layer.

Emphasized herein by way of illustration is the exemplary DRAG structure 100 where an optical distortion-reducing layer 15 has a lower refractive index than underlying transparent medium 10. In this case, the AG surface 14 may be configured for the case of an optical distortion-reducing layer 15 having an index of refraction that is less than that of transparent medium 10, i.e., for the condition $n_3<n_2<n_1$. For this situation, valleys V of original surface 14-1 as shown in FIG. 2 are now overfilled rather than underfilled, so that optical distortion-reducing layer 15 forms bumps that are highest where the valleys are deepest, as illustrated in FIG. 3A. FIG. 3A is a plot showing a close-up inset view of FIG. 2 with an exemplary DRAG structure for the case $n_3<n_2<n_1$. FIG. 3B is a plot showing a close-up inset view of FIG. 2 including an anti-reflection (AR) layer atop the distortion-reducing layer.

The exemplary AG surface 14 of FIG. 2 has little or no added coating material at peaks P of the surface. However, with reference to FIG. 3B, in an exemplary embodiment, an additional coating layer 17 may be added immediately adjacent coating layer 15 (and any exposed portions of first surface 14-1) without impacting the reduced optical distortion associated with the AG surface 14. For example, a coating layer 17 may configured as an anti-reflection (AR) coating (e.g., it may consist of multiple sub-layers) to thereby provide both anti-glare and anti-reflection properties to a transparent medium 10.

In an exemplary embodiment, the AG surface 14 may be designed so essentially no image optical distortion exists. This may be accomplished by requiring that $\phi(x,y)$ be substantially or identically constant. However, in practice, it is difficult to fabricate an AG surface 14 in a manner resulting in $\phi(x,y)$ being identically constant (including being equal to zero). However, an aspect of the present disclosure is directed to reducing the image optical distortion from the transparent medium 10, recognizing that in many applications a partial reduction may be easier and more cost-effective to implement than a full reduction or even close to a full reduction.

Thus, in an exemplary embodiment, Eq. 3 need not be satisfied exactly. Accordingly, statistics of the residual phase across the surface $\phi(x,y)$ may be examined by the following equation:

$$\Delta\varphi(x, y) = \frac{2\pi}{\lambda}\left[h_2(x, y) - \frac{(n_2 - n_1)}{(n_2 - n_3)} h_1(x, y)\right]. \quad \text{Eq. 5}$$

For an exact phase match, it is specified that $\Delta\phi(x,y)=\Delta\phi_0$ so that $\Delta\phi_{rms}=0$, where $\Delta\phi_{rms}$ represents the root mean square of $\Delta\phi(x,y)$. When the coating does not exactly satisfy Eq. 3, for example, it may be required that $\Delta\phi_{ms}$ be approximately less than about $2\pi/10$ to achieve a substantial reduction in the amount of optical distortion.

Embodiments of the present disclosure may include configurations that do not necessarily have discrete first and second surfaces 14-1 and 14-2. Thus, in an alternative approach, the transparent medium 10 may have a textured surface 14-1. To see how this type of surface behaves in reflection and transmission, the light phase modulation introduced by textured surface 14-1 as well as by a bulk refractive-index modulation is given by:

$$E_{after} = E_{before}\, e^{i\phi(x,y)} = E_{before}\, e^{i\frac{2\pi}{\lambda}\cdot[n_1 h_1(x,y)+\Delta OPL_{bulk}(x,y)+n_3(t-h_1(x,y))]} \quad \text{Eq. 6}$$

where $h_1(x,y)$ represents the topology of the textured surface 14-1, $n_1$ represents the mean index of the bulk material and $\Delta OPL_{bulk}(x,y)$ represents the topology of the bulk optical path length variation, as defined by the integral in the direction of the bulk optical path length (i.e., the Z-direction, as shown in FIG. 2, for example):

$$\Delta OPL_{bulk}(x, y) = \int_{bulk} (n_{bulk}(x, y, z) - n_1)\,dz \quad \text{Eq. 7}$$

The phase upon reflection for reflected ambient light 26 is given by $$\varphi_R(x, y) = \frac{2\pi}{\lambda}[2n_3(t - h_1(x, y))],$$

which to at least a first approximation, is a function of the surface roughness of first surface 14-1. Consequently, the first surface 14-1 may be configured with a surface shape providing desired scattering properties when reflecting ambient light 26 to reduce the amount of glare light 26G.

The phase for transmitted light 36 is denoted phase $\phi_T(x,y)$ and is given by:

$$\varphi_T(x, y) = \frac{2\pi}{\lambda}\cdot[n_1 h_1(x, y) + \Delta OPL_{bulk}(x, y) + n_3(t - h_1(x, y))],$$

which depends on both the surface roughness and the bulk index variations. It is thus possible to define bulk index variations $n_{bulk}(x,y,z)-n_1$ that compensate for the phase variations associated with the surface texture (shape) of first surface 14-1 via the relationship:

$$\varphi(x, y) = \quad \text{Eqs. 8a-8c}$$
$$\frac{2\pi}{\lambda}\cdot[n_1 h_1(x, y) + \Delta OPL_{bulk}(x, y) + n_3(t - h_1(x, y))] = const$$
$$(n_1 - n_3)h_1(x, y) - (\Delta OPL_{bulk}(x, y) = const$$
$$\Delta OPL_{bulk}(x, y) = (n_3 - n_1)h_1(x, y)$$

where the constant phase is chosen to be zero.

Equations 8a-8c provide a prescription defining the ideal bulk index variation that compensates for the phase distortion caused by the surface $h_1(x,y)$. When $n_3$ is less than $n_1$, the bulk optical path change defined by Eq. 7 will be less than zero in regions where $h_1(x,y)$ has a peak and greater than zero where $n_1(x,y)$ has a valley. In terms of refractive index, this means that the bulk refractive index will be less than $n_1$ in regions where $h_1(x,y)$ has a peak and greater than $n_1$ where $n_1(x,y)$ has a valley. The exact nature of the index variation (i.e. its magnitude and spatial extent) is determined by Eq. 7. The index variation may be locally constant, i.e., isolated, but have uniform regions of higher or lower refractive index, or may be represented by a gradient in the refractive index, i.e., the magnitude of the variation may vary spatially.

Dual-Surface AG Structure

In many AG applications, only one surface 14 or 18 of transparent medium 10 needs AG properties. In these applications, the second surface 18 may be effectively eliminated by index matching this surface to another transparent medium. However, if this second surface 18 allows an optical reflection because of an index mismatch across the surface, one must either use an AR coating or an AG coating to eliminate the reflected image associated with this surface. Applications that may require dual surface AG include, but are not limited to, windows, transparent displays and transparent media separated by an air gap.

Figure 4:
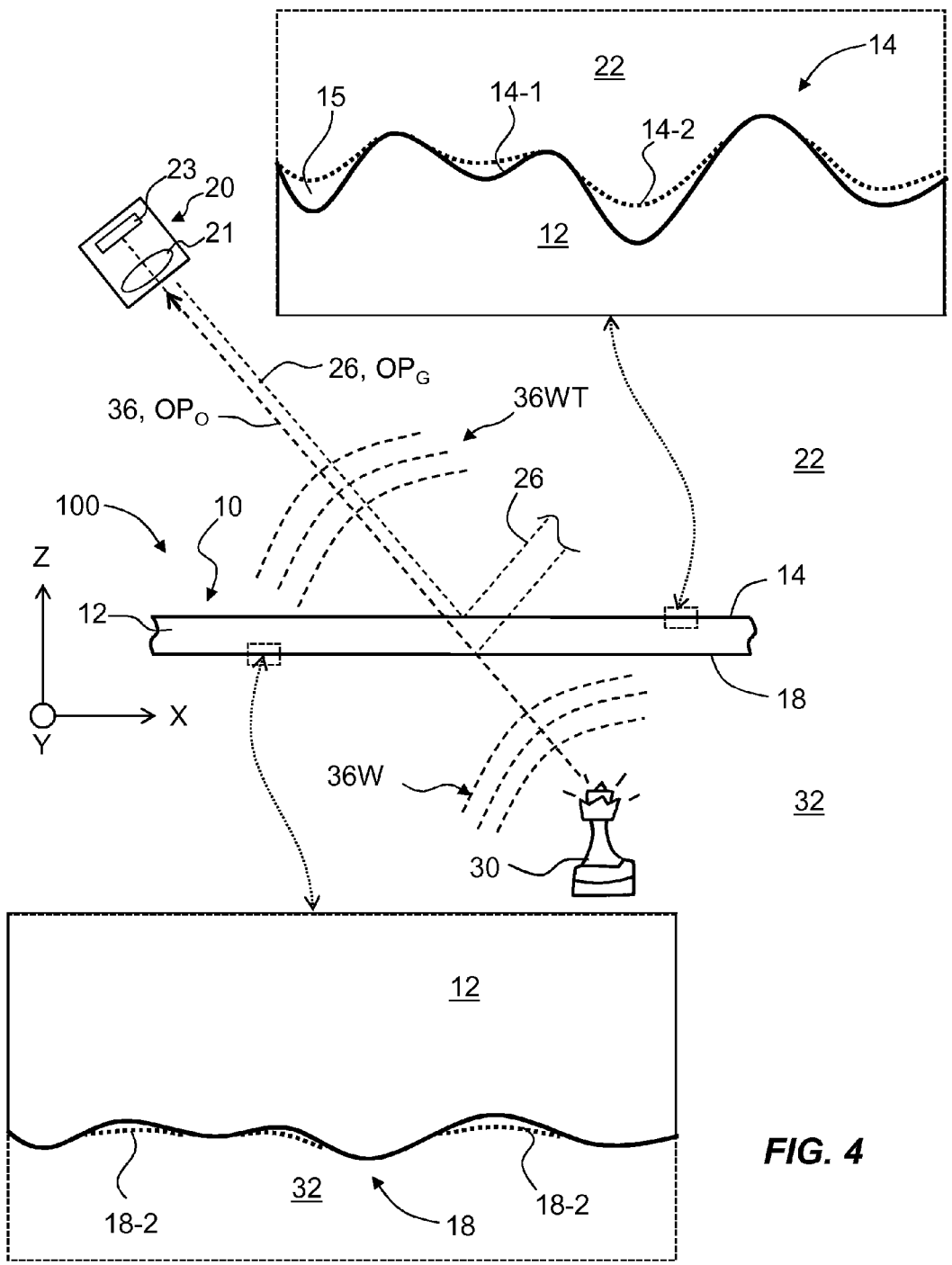
FIG. 4 is an illustration of an exemplary configuration of an imaging system that includes a transparent medium having an exemplary dual-sided DRAG structure.

FIG. 4 is an illustration of an exemplary configuration of an imaging system that includes a transparent medium having an exemplary dual-sided DRAG structure. With reference to FIG. 4, as with upper surface 14, the phase distortion of a lower surface 18 may be eliminated in a DRAG structure 100. The procedure for designing a dual-surface DRAG structure 100 is the same as described above and care should be taken to define the indices and heights in this "inverted" scenario.

One difference between the upper or exterior surface 14 and lower or interior surface 18 is the requirement on surface roughness to obtain adequate AG scattering. A simple model for low scattering is:

$$\frac{P_{scat}}{P_{inc}} = \left(\frac{2\pi\delta_{rms}\Delta n}{\lambda}\right)^2 \quad \text{Eq. 9}$$

where $\Delta n = 2n_i$, where $n_i$ represents the refractive index of the medium from which the light is incident on the scattering surface, and $\delta_{rms}$ represents the root-mean-square value of the surface roughness. For the exterior surface 14 this would be $n_3$, which is typically air or $n_3=1$. However, for the interior surface 18 this refractive index $n_i$ would be $n_1$, which is typically a transparent dielectric with $n_1=1.5$.

Thus, the scattering on the upper surface 14 would be a factor of 2.25 times smaller because of the lower refractive index for the same surface roughness. If a comparable level of scattering is required from each surface, then the exterior DRAG surface 14 would require an RMS roughness $\delta_{rms}$ of 1.5 times greater than the interior DRAG surface 18. More complex models of light scattering are required to describe the AG process in more detail, but one of skill in the art may use Eq. 9 as a guide for the optimization of the two DRAG layers 14 and 18 on a dual AG transparent substrate 100.

FIG. 4 shows an exemplary embodiment of a double-sided DRAG structure 100, which requires the creation of a phase correcting surface on both upper and lower surfaces 14 and 18. For the same level of AG performance, the lower surface 18 requires a lower surface roughness than the upper surface 14 because of the higher index in the region 12 compared to the region 22. Assuming that the region 12 is a glass or a polymer with a refractive index near 1.5 and that the region 22 is air with a refractive index of 1, the ratio between the surface roughnesses of surfaces 14 and 18 is approximately $(1.5)^2$ or 2.25.

Although the above description describes an optimized dual-surface DRAG structure, in some cases for ease of manufacturing, it will be desirable to create identical DRAG surfaces on both sides of transparent substrate 100. In this case, the basic principles of the disclosure still apply, and the surface roughness of each surface may be chosen to be large enough (e.g. greater than about 80 nm RMS) such that substantially all specular reflection is eliminated for all reflected light from both directions striking both surfaces, even if this is a larger amount of total scattering than is strictly necessary in the optimized case. This structure will reduce or eliminate substantially all specular reflections for viewers on both sides of the transparent article, while preserving the reduced distortion of the optical images viewed in transmission.

Optical Modeling

The operability of the embodiments disclosed herein may be understood and implemented as described by employing optical modeling. An example of such modeling applies a full vectorial solution of Maxwell's equations through a finite-difference time-domain (FDTD) method that accounts for relevant optical effects.

Figure 5A:
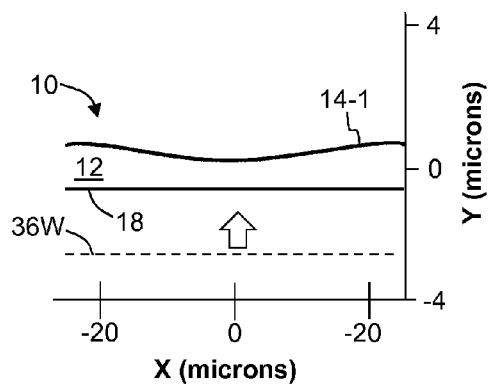
FIG. 5A is a plot illustrating an exemplary transparent medium wherein a first surface is a conventional AG surface that is sinusoidal and uncoated.
Figure 5B:
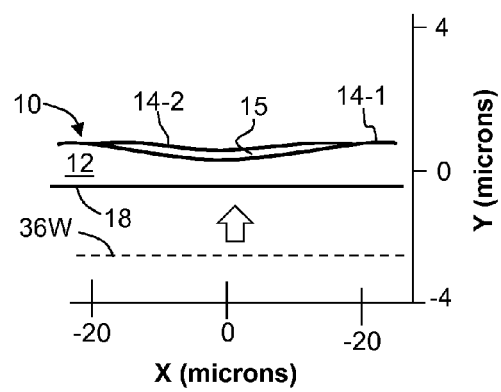
FIG. 5B is a plot illustrating a transparent medium wherein the sinusoidal first surface is the same as that of FIG. 5A, and further includes an optical distortion-reducing layer defining a second surface having a DRAG structure satisfying the condition for distortion-free imaging through the transparent medium.

FIG. 5A is a plot illustrating an exemplary transparent medium wherein a first surface is a conventional AG surface that is sinusoidal and uncoated. FIG. 5B is a plot illustrating a transparent medium wherein the sinusoidal first surface is the same as that of FIG. 5A, and further includes an optical distortion-reducing layer defining a second surface having a DRAG structure satisfying the condition for distortion-free imaging through the transparent medium. With reference to FIG. 5A, the figure shows a transparent medium 10 where a first surface 14-1 is a conventional AG surface that is sinusoidal and uncoated. FIG. 5B shows a transparent medium 10 where the sinusoidal first surface 14-1 includes an optical distortion-reducing layer 15, which defines second surface 14-2 and satisfies the optical-distortion-free-imaging requirement of Eq. 3, above. The transparent medium 10 is modeled as a glass substrate having a refractive index $n_1=1.5$, while optical distortion-reducing layer 15 has a refractive index $n_2=2.0$. FIG. 5A and FIG. 5B also show a single-plane wavefront 36W of unit electric field amplitude on its way to passing through the respective structures at normal incidence (i.e., with the plane wave parallel to lower surface 18). The single plane wavefront 36W represents a pulse of light 36 from an object (not shown). The x-directions and y-directions are shown, with the units in microns.

Figure 6A:
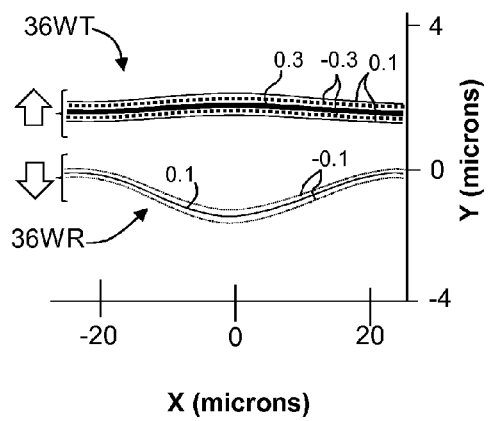
FIG. 6A is a plot illustrating a finite different time domain (FDTD) simulation result for wavefronts having passed through the transparent medium of FIG. 5A.
Figure 6B:
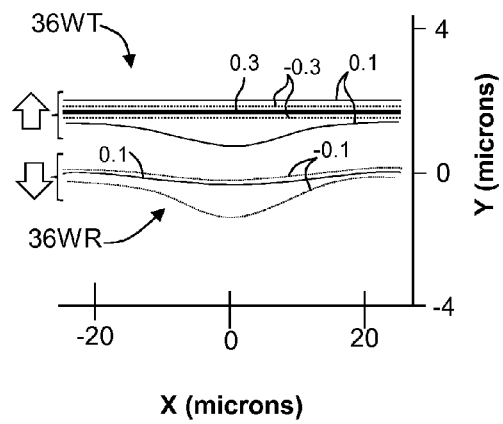
FIG. 6B is a plot illustrating a FDTD simulation for the transparent medium of FIG. 5B.

FIG. 6A is a plot illustrating a finite different time domain (FDTD) simulation result for wavefronts having passed through the transparent medium of FIG. 5A. FIG. 6B is a plot illustrating a FDTD simulation for the transparent medium of FIG. 5B. With reference to FIG. 6A, a FDTD simulation result is shown for wavefronts 36WT having passed through the transparent medium 10. FIG. 6B provides the corresponding simulation for the transparent medium 10 including an optical distortion-reducing layer 15. Also shown in the plots are reflected wavefronts 36WR. The transparent medium 10 and the combined transparent medium and optical distortion-reducing layer 15 are omitted from FIGS. 6A and 6B, respectively, for ease of illustration. Some of the relative electric-field-amplitude contours of transmitted and reflected wavefronts 36WT and 36WR are shown, and these wavefronts represent a snapshot of the electric field amplitude.

It can be seen that the transmitted and reflected wavefronts 36WT and 36WR of FIG. 6A are clearly distorted. The amplitude of the reflected wavefronts 36WR is substantially less than that of the transmitted wavefronts 36WT. The transmitted wavefronts 36WT of FIG. 6B are substantially flat (demonstrating low distortion in transmission) while the reflected wavefronts 36WR of FIG. 6B are still somewhat distorted (demonstrating a beneficial AG effect in reflection) when compared to their counterparts in FIG. 6A. Similar results were obtained for a continuous beam of object light 36 and at higher incident angles of up to 30 degrees.

Figure 7A:
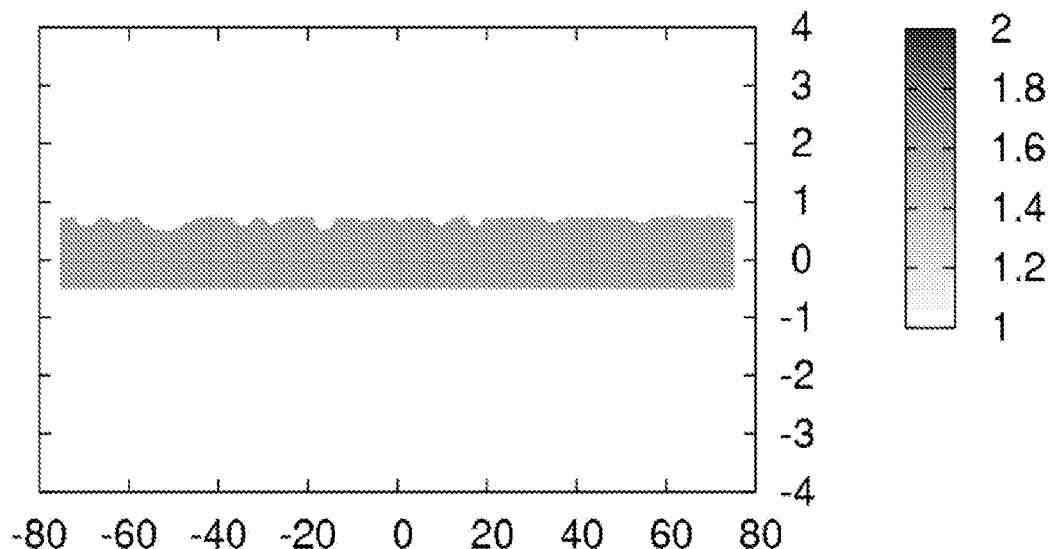
FIG. 7A is a schematic diagram of an exemplary transparent medium having a relatively complex conventional first surface without an optical distortion-reducing layer.
Figure 7B:
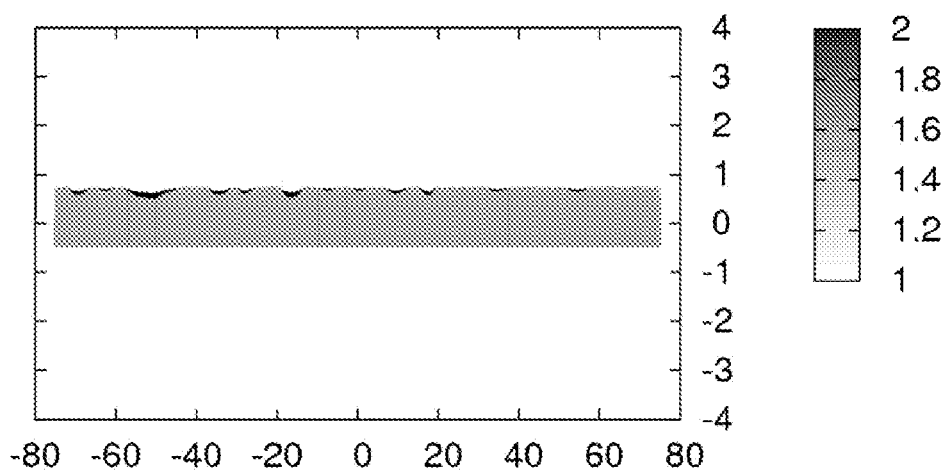
FIG. 7B is a schematic diagram of an exemplary transparent medium having the first surface of FIG. 7A and including an optical distortion-reducing layer to form a DRAG structure.
Figure 8A:
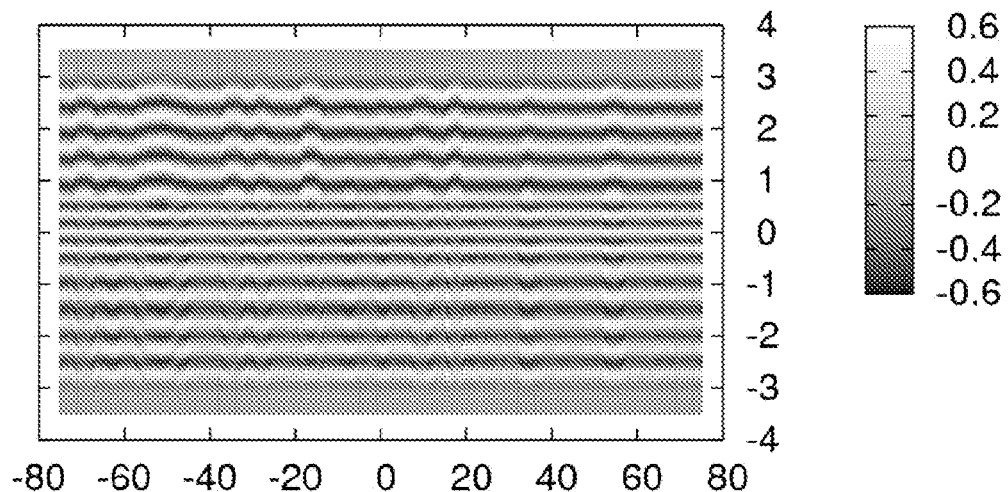
FIG. 8A is an illustration of transmitted and reflected plane waves by the transparent medium of FIG. 7A.
Figure 8B:
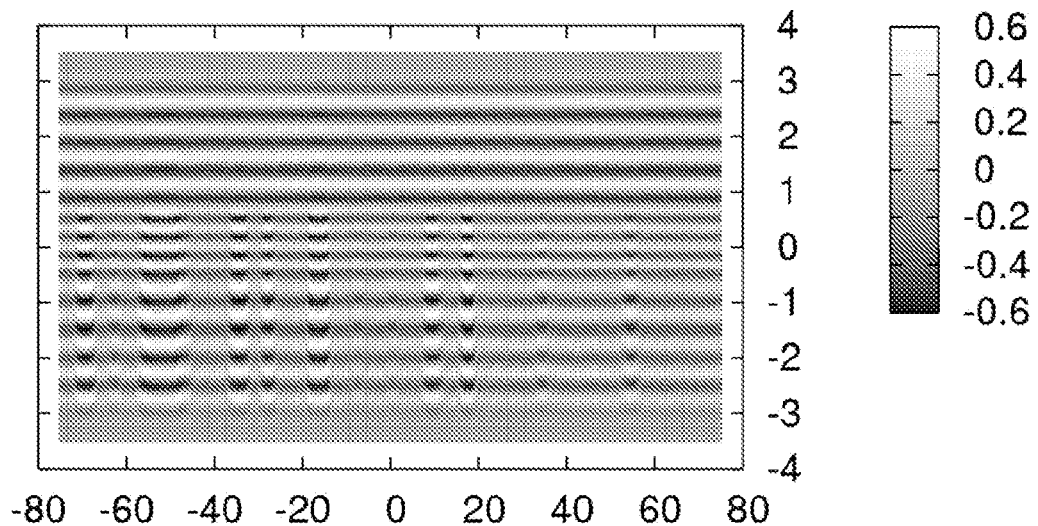
FIG. 8B is an illustration of transmitted and reflected plane waves by the DRAG structure of FIG. 7B.

FIG. 7A is a schematic diagram of an exemplary transparent medium having a relatively complex conventional first surface without an optical distortion-reducing layer. FIG. 7B is a schematic diagram of an exemplary transparent medium having the first surface of FIG. 7A and including an optical distortion-reducing layer to form a DRAG structure. FIG. 8A is an illustration of transmitted and reflected plane waves by the transparent medium of FIG. 7A. FIG. 8B is an illustration of transmitted and reflected plane waves by the DRAG structure of FIG. 7B. With reference to FIGS. 7A, 7B, 8A and 8B, FIG. 7A provides a schematic diagram of an example transparent medium 10 having a more complex first surface 14-1 without optical distortion-reducing layer 15, while FIG. 7B is similar to FIG. 7A but includes the optical distortion-reducing layer. FIG. 8A shows transmitted and reflected plane waves 36WT and 36WR, with the transmitted waves having substantial optical distortion induced by the features in a first surface 14-1. In contrast, the transmitted plane waves 36WT of FIG. 8B are substantially planar, with the high-frequency components being a vestige of the numerical sampling of the FDTD calculation.

As discussed above in connection with FIG. 3B, the presence of a high-index optical distortion-reducing layer 15 may increase the amount of glare light 26G that may reach a viewing optical system 20. In situations where this is undesirable, the amount of glare light 26G may be reduced by the addition of aforementioned AR coating layer 17 (FIG. 3B). Because the thickness of the AR coating layer 17 will vary as a function of the varying height $h_2(x,y)$ of second surface 14-2, the AR effect will also vary to some extent. Consequently, the total amount of glare light 26G, while being reduced on average, will tend to have spatial variations.

Figure 9:
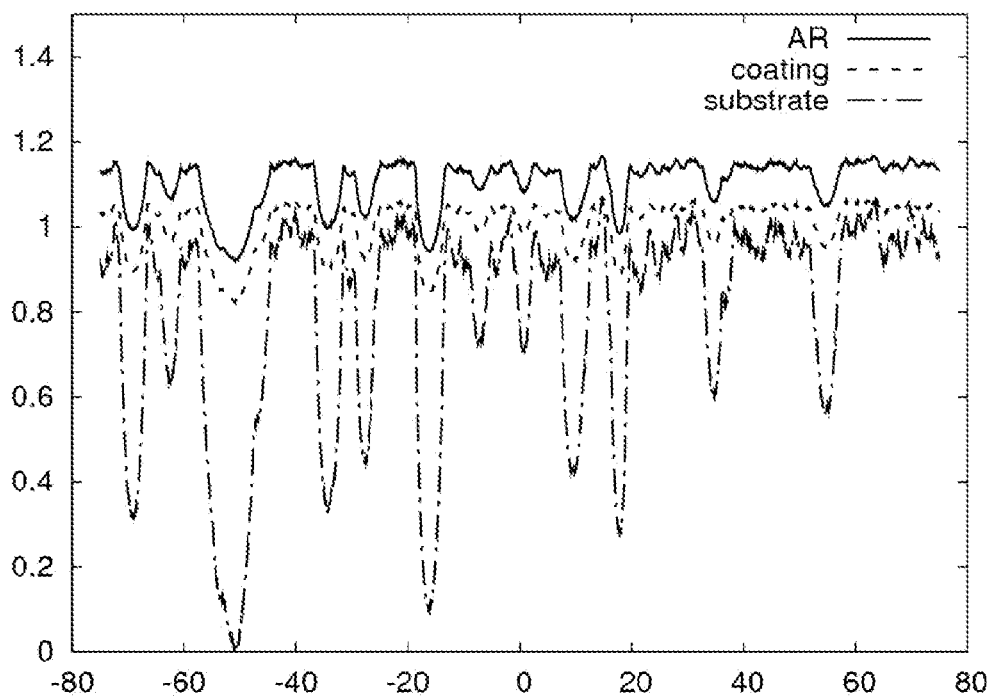
FIG. 9 is a plot of an exemplary DRAG structure for a surface roughness profile including a high-index optical distortion-reducing layer on the first surface and an exemplary AR coating on the second surface.
Figure 10:
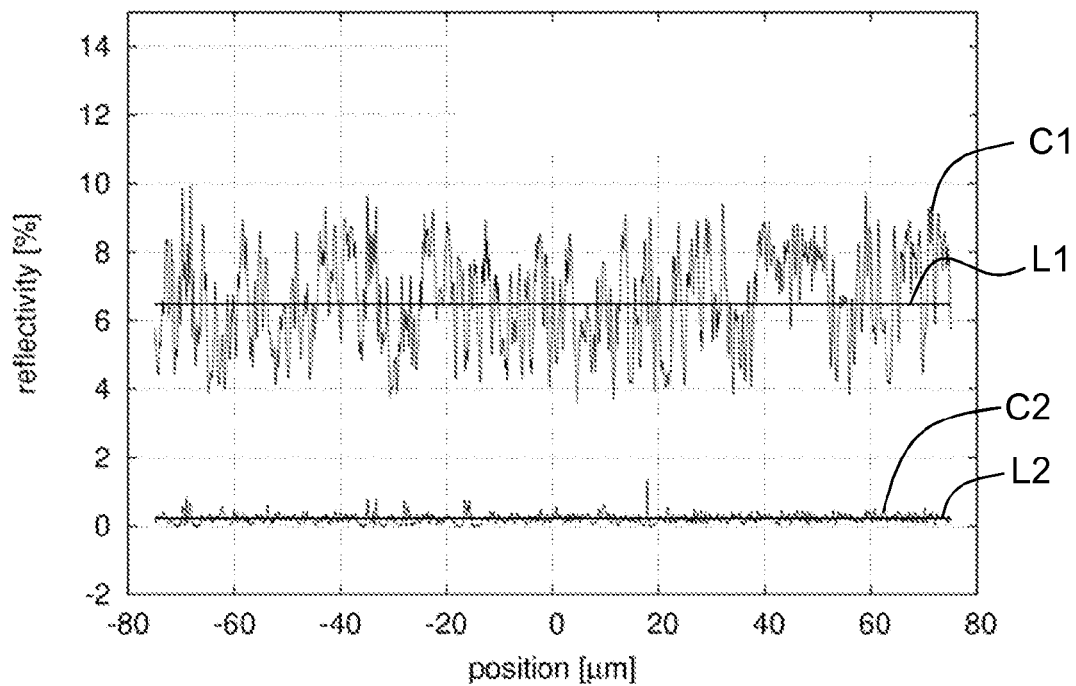
FIG. 10 is a plot of near-field and average reflectivities as a function of position across the example DRAG structure of FIG. 9.

FIG. 9 is a plot of an exemplary DRAG structure for a surface roughness profile including a high-index optical distortion-reducing layer on the first surface and an exemplary AR coating on the second surface. FIG. 10 is a plot of near-field and average reflectivities as a function of position across the example DRAG structure of FIG. 9. With reference to FIG. 9, a high-index optical distortion-reducing layer 15 may reside on a first surface 14-1, and an exemplary AR coating layer 17 may reside on second surface 14-2. The axis labels are in microns. FIG. 10 plots the near-field and average reflectivities as a function of position across the exemplary DRAG structure 100 of FIG. 9. The jagged curve C1 represents the near-field reflectivity measured ~100 nm above the surface for the case of no AR coating layer. The thick horizontal line L1 represents the average reflectivity over the 150-µm range of the position on the surface. The jagged curve C2 and corresponding horizontal line L2 represent the same near-field and average reflectivities for the case of an AR coating layer 17 whose refractive index is $n_{AR}=\sqrt{1.65}\approx1.2845$. The film thickness of AR coating layer 17 is $t=500$ nm/$(4 \cdot n_{AR})$. The reduced reflectivities in the plot of FIG. 10 may thus correspond to a substantial reduction in the variation in glare light 26G when an exemplary AR coating 17 is employed.

Figure 11:
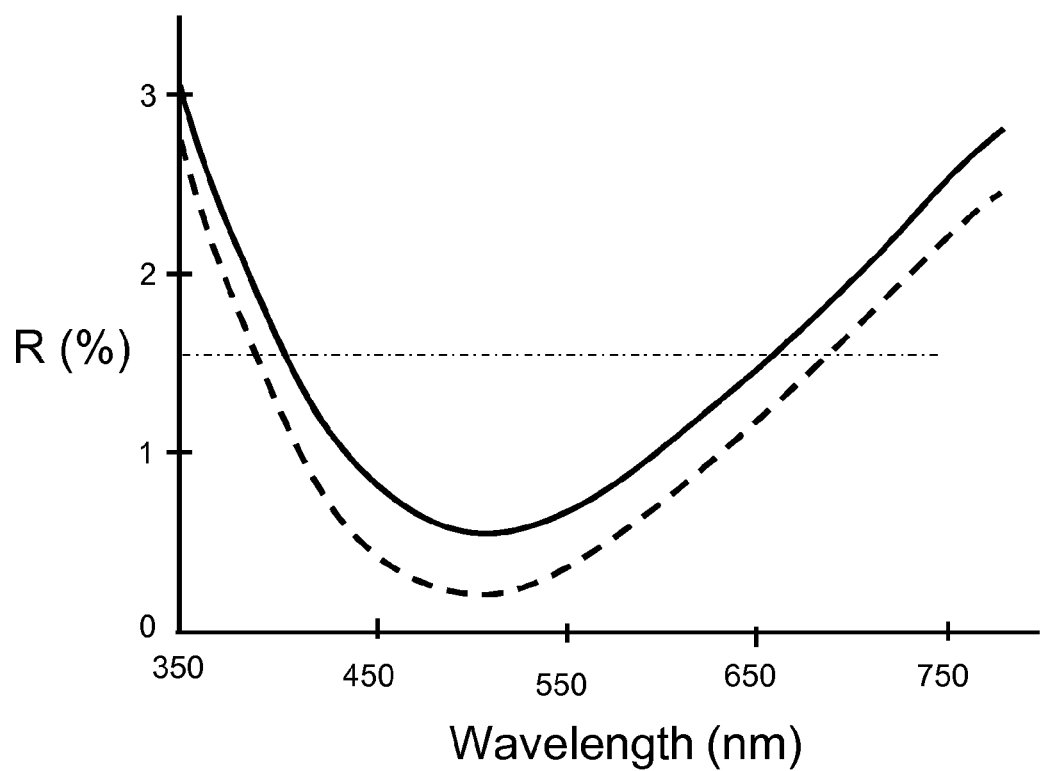
FIG. 11 is a plot of average reflectivity as a function of wavelength of light for the exemplary DRAG structure of FIG. 9 for two different AR coatings (layers).

FIG. 11 is a plot of average reflectivity as a function of wavelength of light for the exemplary DRAG structure of FIG. 9 for two different AR coatings (layers). With reference to FIG. 11, a plot of the average reflectivity R (%) as a function of wavelength (nm) of ambient light 26 for the DRAG structure 100 of FIG. 9 for the case of an ideal AR coating layer 17 ($n_{AR}=\sqrt{1.65}\approx1.2845$) (dashed line) as well as for the case of a MgF$_2$ AR coating ($n_{AR}=1.380$) (solid line) is provided. In both cases, $n_2=1.65$ and the film thickness t of AR coating layer 17 was taken to be $t=500$ nm/$(4 \cdot n_{AR})$. The plot of FIG. 11 shows that the reflectivity from 450 nm to 650 nm is less than 1.5%, which is still considerably more than the ~0.2% for the ideal AR coating index at the design wavelength of 500 nm. However, it is also substantially less than the reflectivity of 6.5% that obtains when the high-index optical distortion-reducing layer 15 is present without the added AR coating layer 17.

Exemplary Fabrication Methods

Figure 12A:
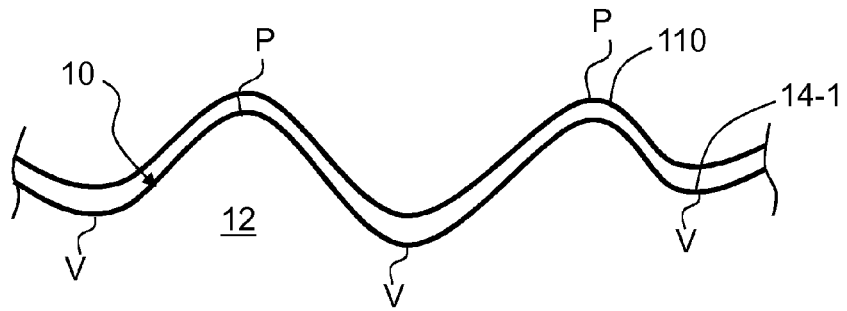
FIGS. 12A through 12D are simplified illustrations of embodiments of fabricating a DRAG structure using a non-wetting material as a masking layer and a high-index material as an optical distortion-reducing layer.

FIGS. 12A through 12D are simplified illustrations of embodiments of fabricating a DRAG structure using a non-wetting material as a masking layer and a high-index material as an optical distortion-reducing layer. With reference to FIGS. 12A-12D, these figures represent close-up cross-sectional views illustrating a non-limiting method of fabricating a DRAG structure 100 using a transparent medium 10. With reference to FIG. 12A, a transparent medium 10 is provided where a first surface 14-1 is textured. The first surface 14-1 may be formed in a variety of manners using known methods such as sandblasting, etching, lapping, embossing, stamping, grinding, micromachining, etc.

The first surface 14-1 may then be coated with a coating layer 110 comprising a phobic material that renders the surface non-wetting. An exemplary material for the coating layer 110 comprises, but is not limited to, phobic silanes, which may be spin-coated on in liquid form. The coating layer 110 may be applied using any known means such as spraying, dip-coating, physical vapor deposition, and spin-coating, depending on the particular material used.

Figure 12B:
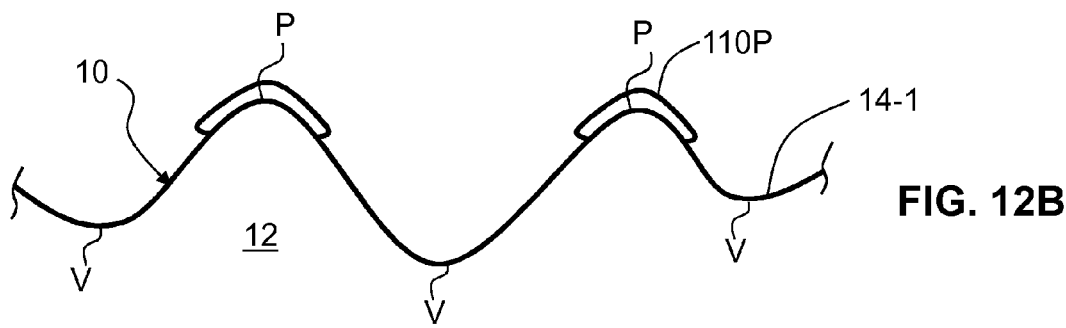

With reference now to FIG. 12B, the coating layer 110 is removed from the first surface 14-1, except for the regions surrounding peaks P, thereby leaving portions 110P of the coating atop the peaks. This may be accomplished, for example, by laser processing, by an optical exposure technique or by thermal processing (e.g., baking, thermal irradiation, etc.), to name a few. In an alternative embodiment, the coating layer 110 may be applied to the regions surrounding each peak P, for example, using methods such as stamping and micro-contact printing.

Figure 12C:
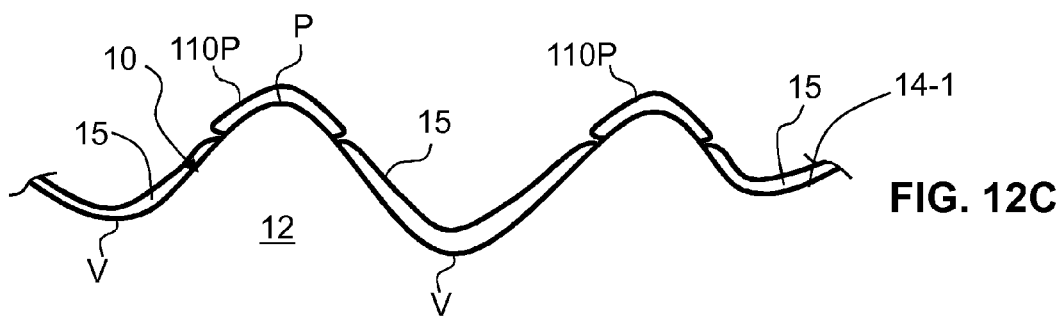

With reference now to FIG. 12C, once the peaks P are coated with portions 110P of non-wetting material, an optical distortion-reducing layer 15 of a relatively high-refractive-index material of refractive index $n_2$ (i.e., $n_2 > n_1$) is applied using, for example, a wet-coating process. Because material portions 110P at the peaks are non-wetting, the wet material for the layer 15 will slip off peaks P and fill valleys V. It should be noted that surface tension may cause the material in layer 15 that fills valleys V to have a meniscus, which causes layer 15 to define second surface 14-2, which at least approximates the second surface shape $h_2(x,y)$ of Eq. 3. The material of layer 15 may be, for example, an aqueous or non-aqueous polymer solution, a solvent-free monomer or polymer mixture, or an aqueous or non-aqueous sol-gel material such as TiO2, ZrO2, Al2O3, SiO2, or combinations of these or other materials known in the art. The layer 15 is then consolidated and solidified (for example, through drying, thermal curing, UV curing, and the like) so that it remains in place on first surface 14-1.

Figure 12D:
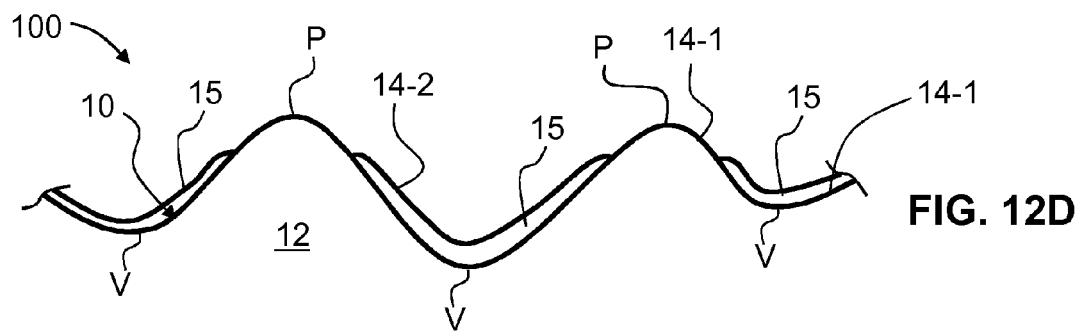

With reference now to FIG. 12D, non-wetting material portions 110P on peaks P are then removed (e.g., stripped using a suitable solvent, plasma cleaning, UV ozone, or heating process) to create the final DRAG structure 100.

Figure 13A:
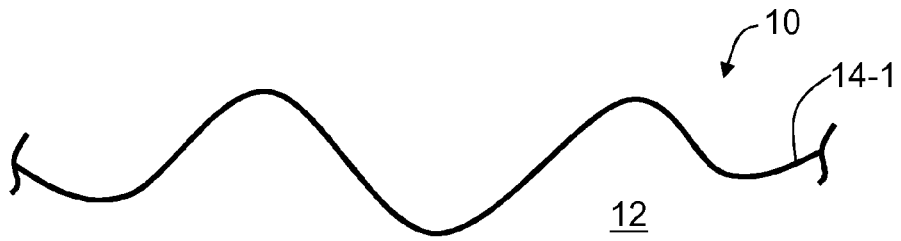
FIGS. 13A through 13C are simplified illustrations of additional embodiments of fabricating a DRAG structure using an ink-jet printer head to selectively deposit a high-index material as the optical distortion-reducing layer.
Figure 13B:
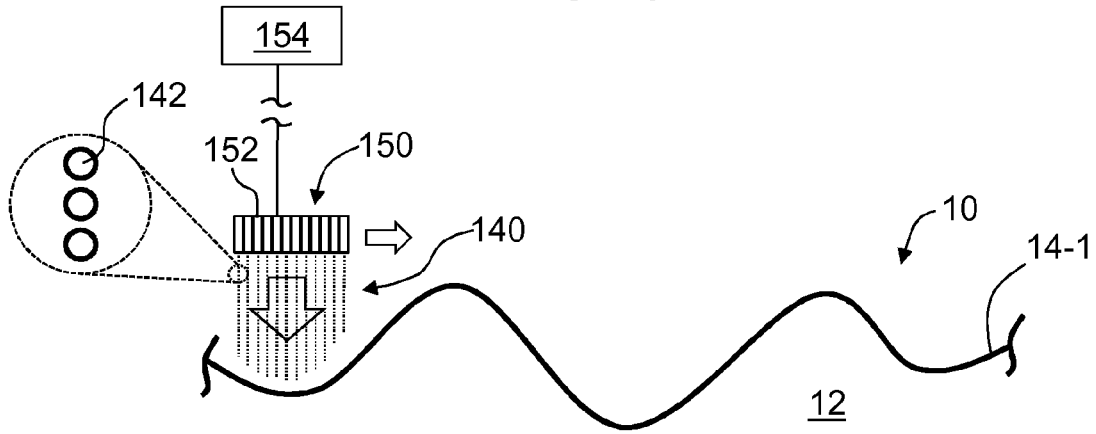
Figure 13C:
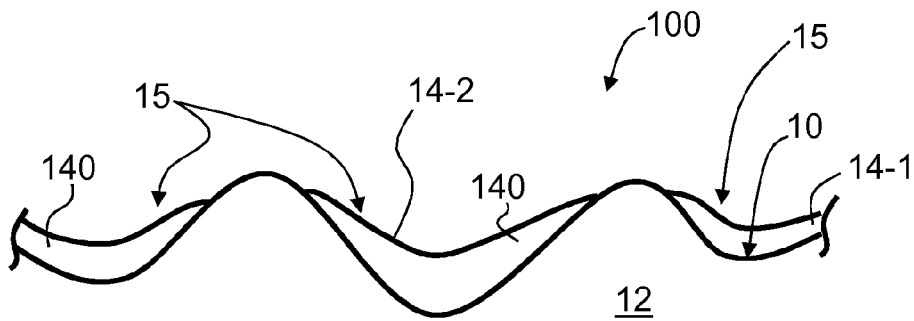

FIGS. 13A through 13C are simplified illustrations of additional embodiments of fabricating a DRAG structure using an ink-jet printer head to selectively deposit a high-index material as the optical distortion-reducing layer. With reference to FIGS. 13A through 13C another exemplary method of fabricating DRAG structure 100 using transparent medium 10 that has a textured first surface 14-1 is shown. FIG. 13A shows a close-up section of the transparent medium 10 and its textured first surface 14-1. With reference now to FIG. 13B, a high-index coating material 140 may be selectively deposited as droplets 142 on the first surface 14-1. In an example, droplets 142 are propelled toward first surface 14-1 using an ink-jet printer head 150 that includes nozzles 152. The ink-jet printer head 150 may be controlled by a programmable controller 154 to apply a pattern on first surface 14-1 that forms second surface 14-2 in accordance with Eq. 3, above, as shown in FIG. 13C.

The first surface shape $h_1$ (x,y) that defines the texture of first surface 14-1 may be measured using confocal microscopy, interferometry, an atomic force microscope, a profilometer or like surface-shape measuring devices. The first surface shape $h_1$ (x,y) may then be provided to controller 154, along with the indices of refraction $n_1$ and $n_2$ for the transparent medium 10 and material 140, respectively. The controller 154 may be programmed to process this information and direct the ink-jet printer head 150 to deposit material 140 to form a transparent layer 15 made of material 140 and having second surface 14-2 substantially defined by surface shape $h_2(x,y)$. The resulting DRAG structure 100 is shown in FIG. 13C.

Figure 14A:
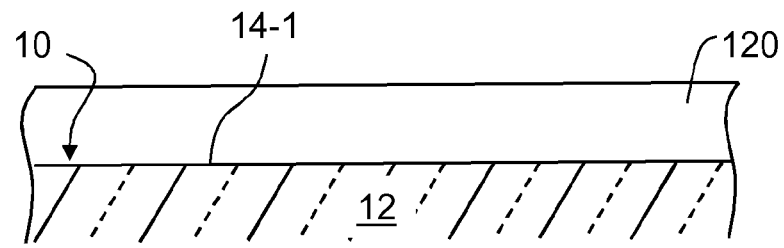
FIGS. 14A through 14D are simplified illustrations of further embodiments of fabricating a DRAG structure.
Figure 14B:
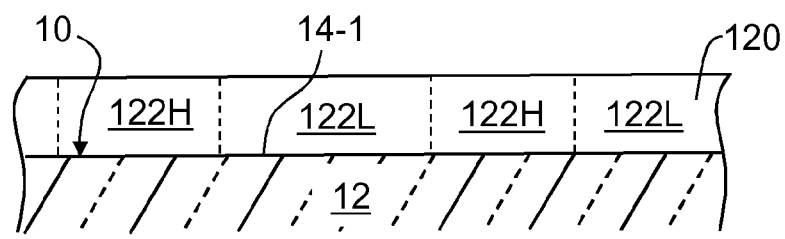

FIGS. 14A through 14D are simplified illustrations of further embodiments of fabricating a DRAG structure. With reference to FIGS. 14A through 14D another exemplary method of fabricating DRAG structure 100 using transparent medium 10 that has a generally planar first surface 14-1 is shown. With reference to FIG. 14A and FIG. 14B, a phase coating 120 may be applied to a transparent substrate 10 on the first surface 14-1. The phase coating 120 may be formulated from a material that ultimately phase-separates and forms different regions 122H and 122L having high and low refractive indices, respectively (and thus different optical phases), where the regions are substantially randomly spatially distributed. This phase separation may occur in a liquid solution state, where phase separation may be driven by solvent or solvent-solute unmixing, as will be described later, or it may occur as a solid-solid phase separation. An exemplary phase coating 120 has the property that regions 122H of a high refractive index have a higher etching rate than regions 122L of a low refractive index.

Figure 14C:
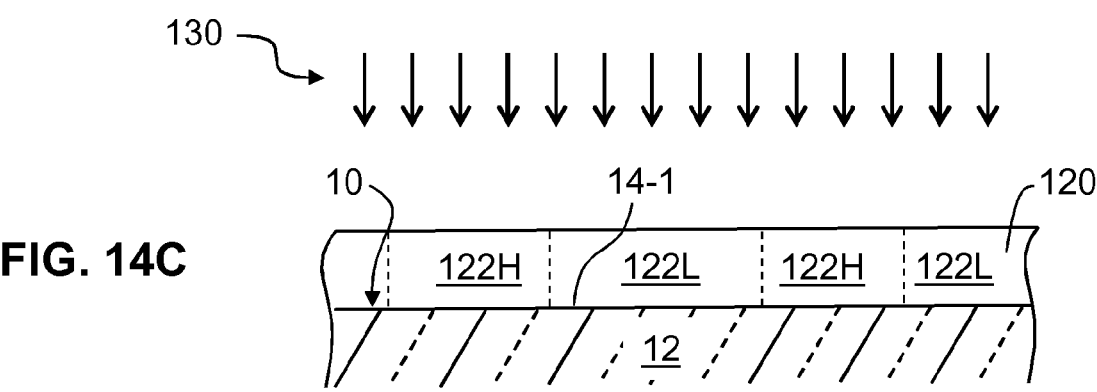
Figure 14D:
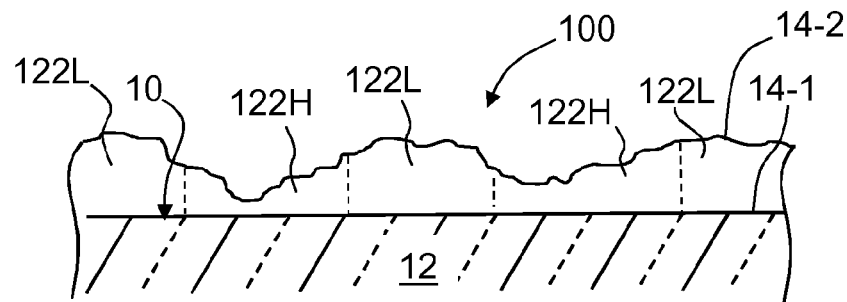

With reference to FIG. 14C, phase coating 120 is etched using an etching process 130 schematically depicted by arrows. The etching process 130 acts to remove the material making up high-index regions 122H faster than it does the material making up low-index regions 122L. The resulting DRAG structure 100 in shown in FIG. 14D.

Figure 15A:
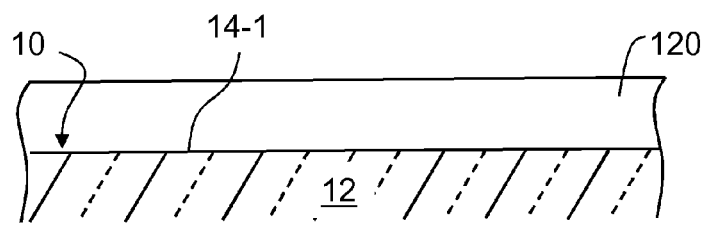
FIGS. 15A through 15D are simplified illustrations of additional embodiments of fabricating a DRAG structure.
Figure 15B:
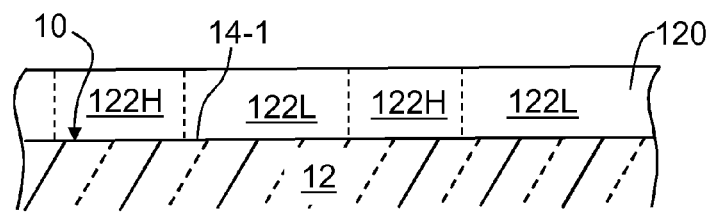
Figure 15C:
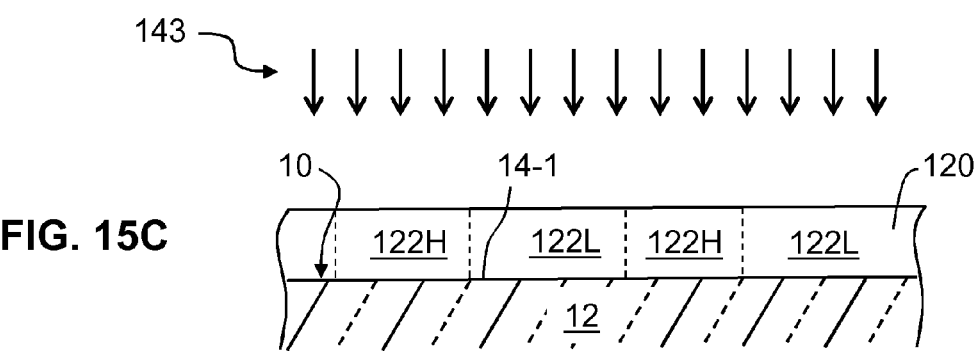
Figure 15D:
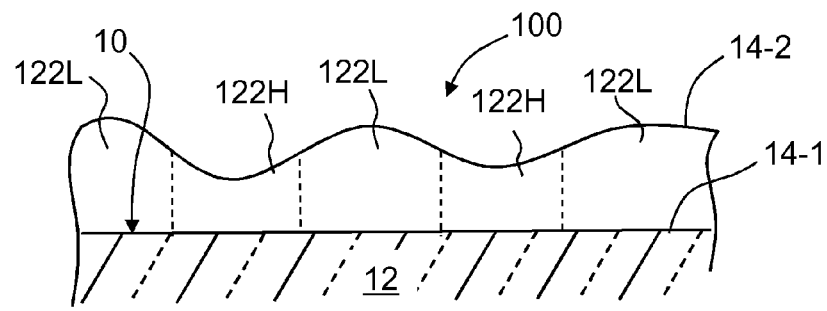

FIGS. 15A through 15D are simplified illustrations of additional embodiments of fabricating a DRAG structure. With reference to FIGS. 15A through 15D, a further method of fabricating DRAG structure 100 using a transparent medium 10 that has a generally planar first surface 14-1 is shown. This method is similar to the previously described method above in that it employs a phase coating 120. However, the regions 122H of phase coating 120 in this exemplary method have an even higher refractive index with a larger thermal consolidation tendency (i.e., the corresponding shrinkage due to sintering) than the lower-index regions 122L. Thus, after the phase coating 120 is applied (FIG. 15A) and then allowed to phase separate (FIG. 15B), heat 143 may be applied to the phase coating, as shown in FIG. 15C. The heat 143 causes the phase coating 120 to sinter and consolidate, with regions 122H and 122L consolidating at different rates, and in particular with low-index regions 122L consolidating by a smaller amount than high-index regions 122H. This difference in consolidation rate may be accomplished by, for example, engineering the phase coating 120 so that the high-index material has a lower glass transition temperature or melting temperature than the low-index material, or by engineering the high-index material in regions 122H to have a greater pore volume that shrinks upon heating. This, in turn, causes the phase coating 120 to take on an undulating shape resulting in DRAG structure 100 shown in FIG. 15D.

Figure 16A:
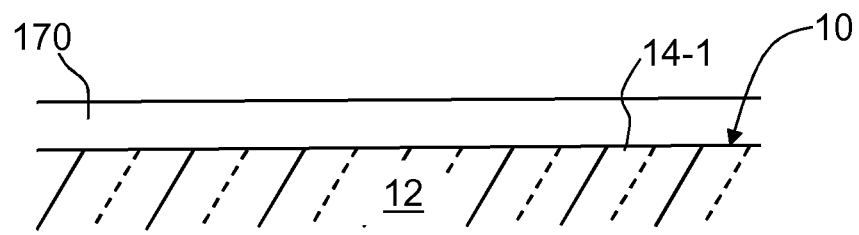
FIGS. 16A through 16H are simplified illustrations of some embodiments of a method of fabricating a DRAG structure using an ion-exchange process.

FIGS. 16A through 16H are simplified illustrations of some embodiments of a method of fabricating a DRAG structure using an ion-exchange process. With reference to FIGS. 16A through 16G another exemplary method of fabricating a DRAG structure 100 using a transparent medium 10 with a planar first surface 14-1 is provided. With reference first to FIG. 16A, a photomasking material 170 is deposited on a first surface 14-1 of the transparent medium 10. An exemplary photomasking material 170 comprises photoresist such as is used in photolithography. The photomasking material 170 is photosensitive so when it is exposed to activating (actinic) light, the exposed material may be selectively removed, leaving a masking pattern. It should be noted, that the photomasking material 170 may comprise a negative photoresist, wherein the exposed material remains and the unexposed material is removed.

Figure 16B:
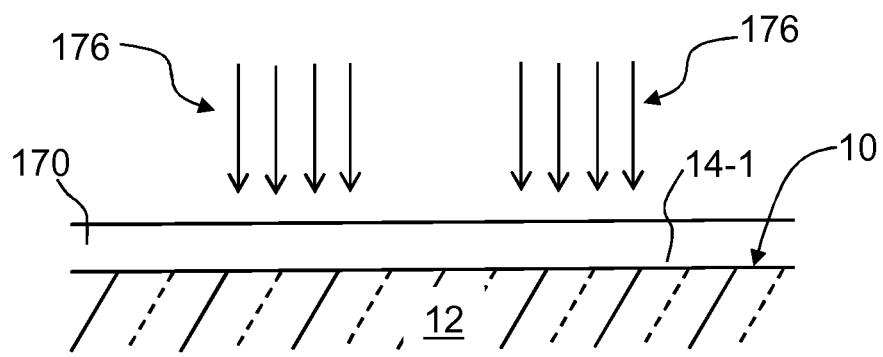

With reference now to FIG. 16B, actinic light 176 may be used to selectively expose the photomasking material 170. For example, actinic light 176 may be directed to the photomasking material 170 through a reticle, while in another example the actinic light is scanned using a select scanning pattern. The exposed photomasking material 170 is then processed (e.g., developed) to create a photomask pattern 170P, as shown in FIG. 16C.

Figure 16C:
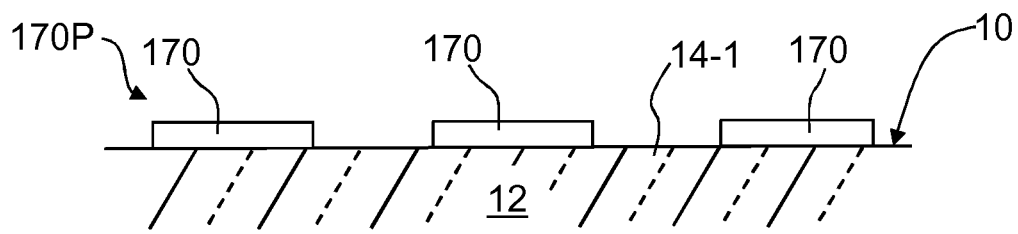
Figure 16D:
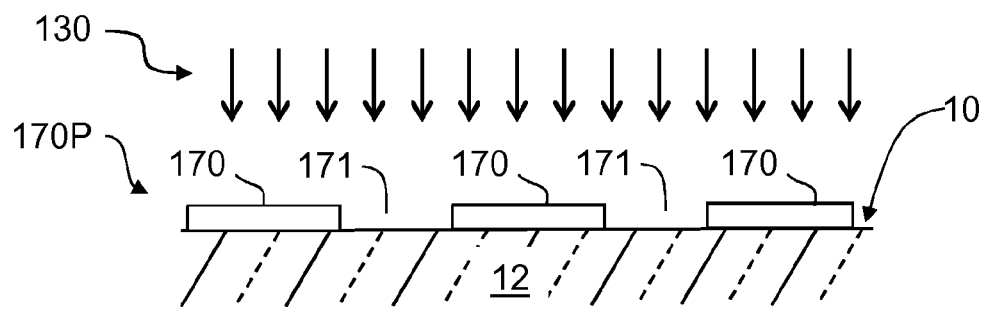
Figure 16E:
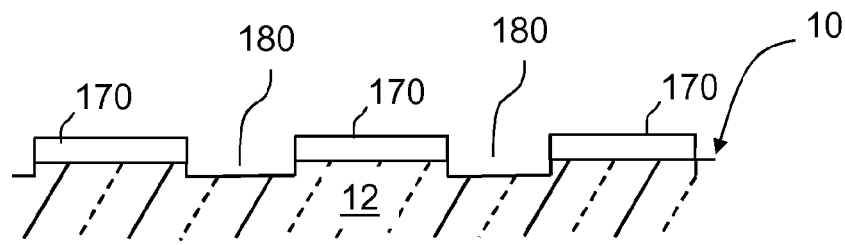

With reference now to FIG. 16D, the structure of FIG. 16C is subjected to an etching process 130. As photomasking material 170 is resistant to etching, the etching process 130 etches into first surface 14-1 of the transparent medium 10 in spaces 171 between the remaining portions of photomasking material 170. The result, which is shown in FIG. 16E, is that depressions 180 are formed in the first surface 14-1 at the exposed locations where spaces 171 are located. The depressions 180 may be thought of as a particular type of valley V having relatively steep, substantially vertical sidewalls and the non-etched portions of the first surface 10 may be thought as a particular type of substantially flat (horizontal) peak P (see e.g., FIG. 12A).

Figure 16F:
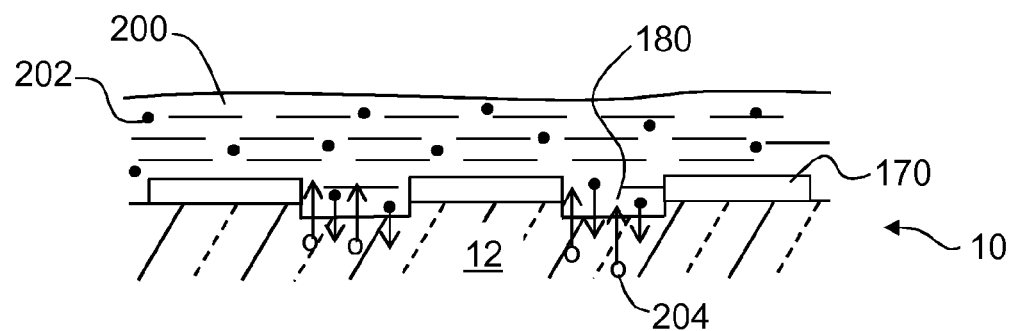

With reference now to FIG. 16F, an ion-exchange process is performed where, e.g., an ion-exchange liquid layer 200 is disposed on the structure of FIG. 16E. The ion-exchange liquid layer 200 includes ions 202 that are exchanged for other ions 204 in the body 12 of the transparent medium 10. For example, the ion-exchange process may be carried out at an elevated temperature, e.g., in a furnace or oven. The ion-exchange process acts to change the refractive index of transparent medium 10 in the locations where ions 202 and 204 are exchanged. Exemplary ions 202 in the ion-exchange liquid layer 200 include potassium and silver. Exemplary transparent medium 10 may include glass.

In some cases, it may be necessary to use an alternate or additional masking material that may be patterned by photoresist, where the alternate masking material acts as a durable diffusion barrier during high-temperature ion-exchange. Such durable masking materials may comprise various dense oxides and nitrides, such as silicon nitride, that may be deposited by known methods such as physical or chemical vapor deposition.

Figure 16G:
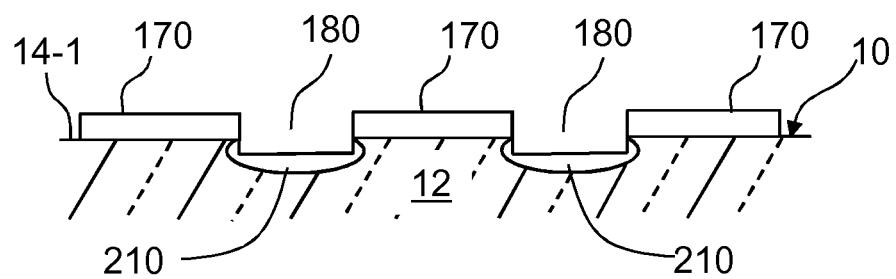
Figure 16H:
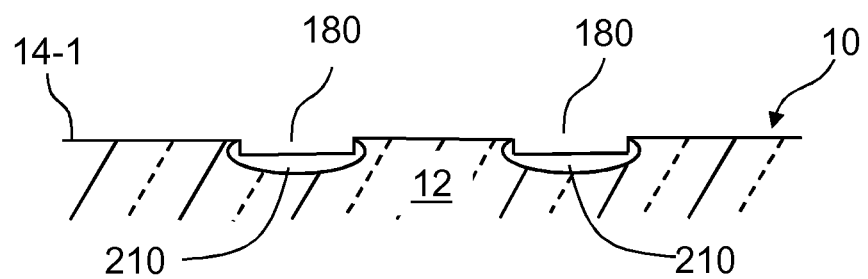

With reference now to FIG. 16G, after the ion-exchange process is carried out, the resulting structure may include ion-exchanged regions 210 in the transparent medium body 12 adjacent the first surface 14-1 and aligned with the depressions 180. The ion-exchanged regions 210 have a refractive index $n_2$ greater than the refractive index $n_1$ of the transparent medium body 12. With reference to FIG. 16H, the remaining photomasking material 170 is removed using known methods once the ion-exchange process is completed.

FIGS. 17A through 17D are simplified illustrations of embodiments of fabricating a DRAG structure where a high-index material is deposited in etched depressions. With reference to FIGS. 17A through 17D an additional exemplary method of fabricating a DRAG structure 100 similar to the example method shown in FIG. 16A through FIG. 16H is provided. The exemplary method may follow the same steps as described above in connection with FIG. 16A through 16E to arrive at the structure of FIG. 17A, where depressions 180 are shown as being deeper than they are in FIG. 16E. In one non-limiting example, the depressions 180 may have substantially vertical sidewalls 181 and the first surface 14-1 may have substantially flat sections (see, e.g., FIG. 17A).

Figure 17A:
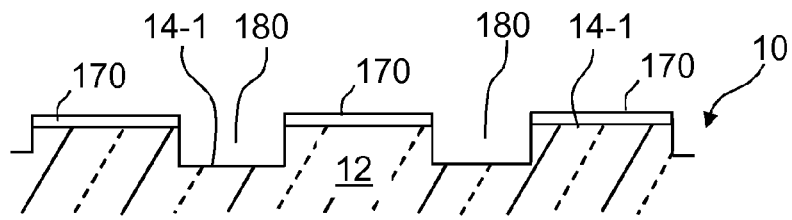
FIGS. 17A through 17D are simplified illustrations of embodiments of fabricating a DRAG structure where a high-index material is deposited in etched depressions.
Figure 17B:
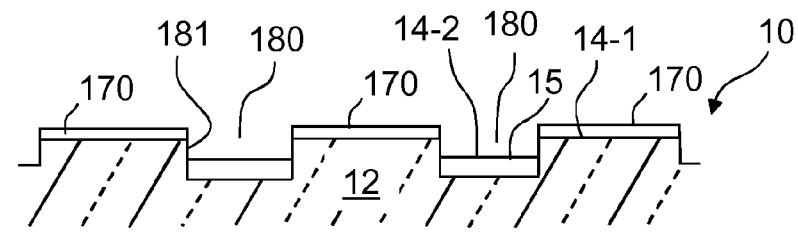
Figure 17C:
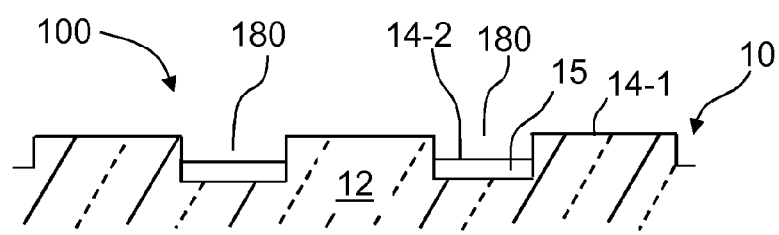
Figure 17D:
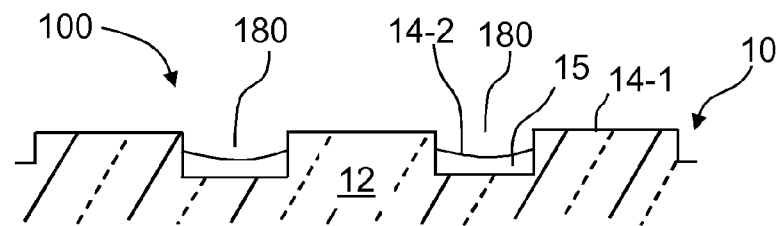

In FIG. 17B, an optical distortion-reducing layer 15 may be deposited (by vapor- or liquid-based coating methods) within the depressions 180. With reference to FIG. 17C, the photomasking material 170 may be removed from the first surface 14-1 to form a DRAG structure 100. FIG. 17D is similar to FIG. 17C and shows an exemplary embodiment where instances of the layer 15 within the depressions 180 have a meniscus shape, which may be derived from the natural flow behavior of a liquid-based coating. In one example, the first surface 14-1 includes flat sections where photomasking material 170 resided.

Figure 18A:
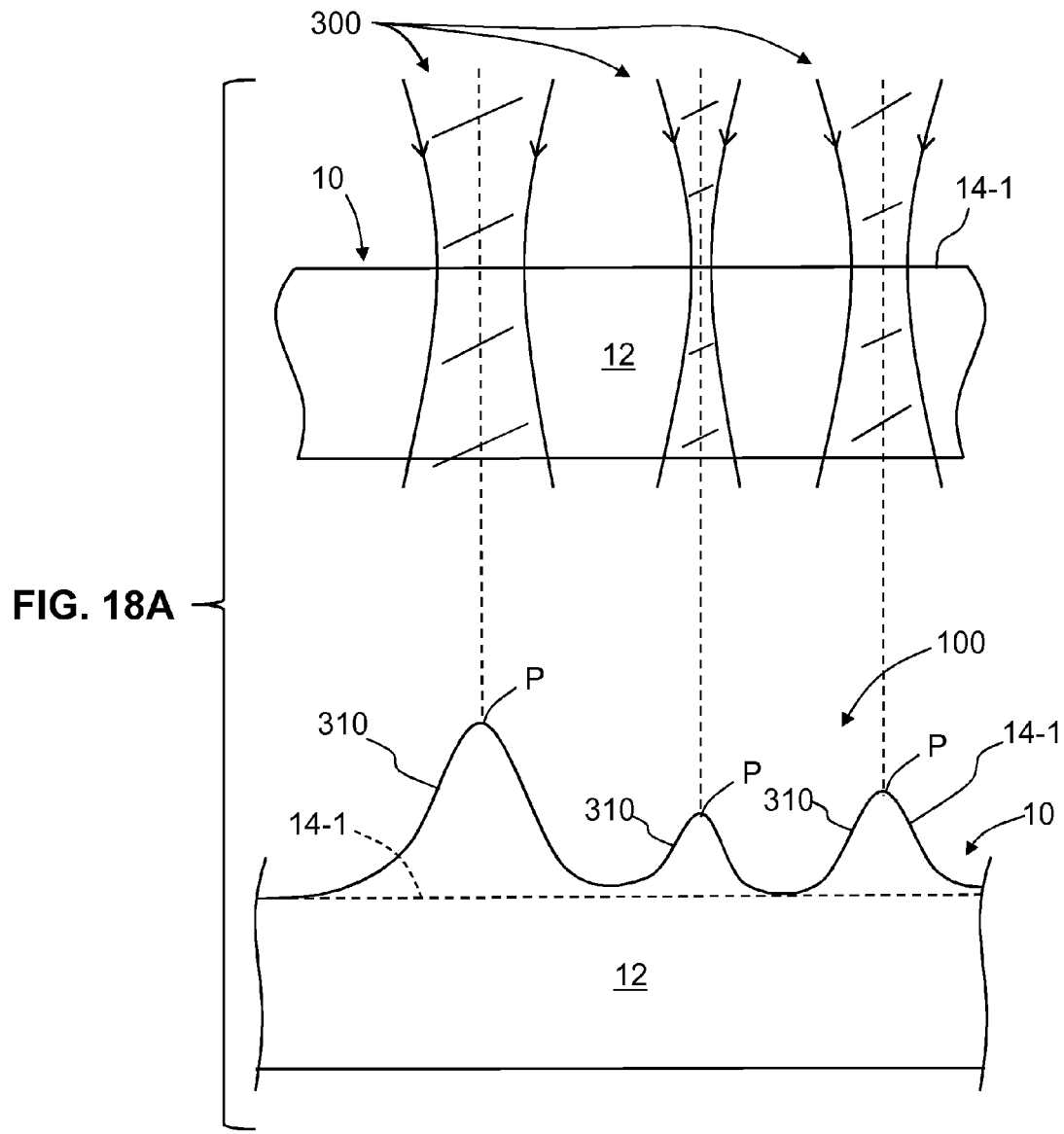
FIG. 18A is a cross-sectional view of an exemplary transparent medium illustrating another embodiment of fabricating a DRAG structure by forming glass bumps on the surface of the transparent medium using localized heating with a pulsed laser.

FIG. 18A is a cross-sectional view of an exemplary transparent medium illustrating another embodiment of fabricating a DRAG structure by forming glass bumps on the surface of the transparent medium using localized heating with a pulsed laser. With reference to FIG. 18A, a transparent medium 10 is shown being irradiated with pulsed laser beams 300 having sufficient power to rapidly and locally heat the first surface 14-1. The first surface 14-1 of the transparent medium 10 may rapidly cool after application of the pulses of laser beams 300. The localized heating may cause localized softening and swelling of transparent medium 10 and, upon rapid cooling, regions of lower density or higher fictive temperature with a larger volume than the initial glass are frozen in place, thereby forming bumps 310 with peaks P. The sizes of the bumps 310 are proportional to the amount of heating provided to the first surface 14-1. The bumps 310 may thus define a textured surface 14-1, with the refractive index of the bumps 310 being lower than that of the unaffected body 12 of the transparent medium 10.

The original planar surface 14-1 prior to the application of the localized heating is shown as a dashed line in the DRAG structure 100. Related materials and methods describing the formation of bumps 310 using localized heating and rapid cooling are disclosed in U.S. Pat. No. 7,480,432, entitled "Glass-based micropositioning systems and methods" and in U.S. Pat. No. 7,505,650, entitled "Microlenses for optical assemblies and related methods," the entirety of each being incorporated herein by reference.

Figure 18B:
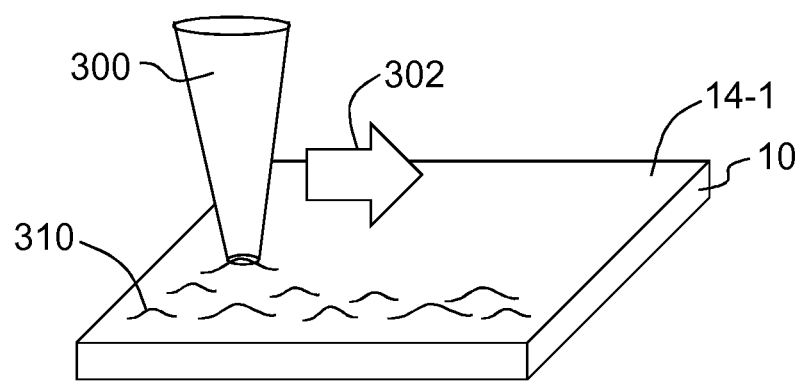
FIG. 18B is a perspective view of an exemplary transparent medium being processed by a laser beam to create glass bumps of various sizes illustrated in FIG. 18A.

FIG. 18B is a perspective view of an exemplary transparent medium being processed by a laser beam to create glass bumps of various sizes illustrated in FIG. 18A. With reference to a transparent medium 10 is shown being processed by a laser beam 300 that, e.g., is scanned to different locations (as indicated by arrow 302) as its intensity is varied, thereby creating bumps 310 of various sizes such as shown in FIG. 18A.

Figure 19A:
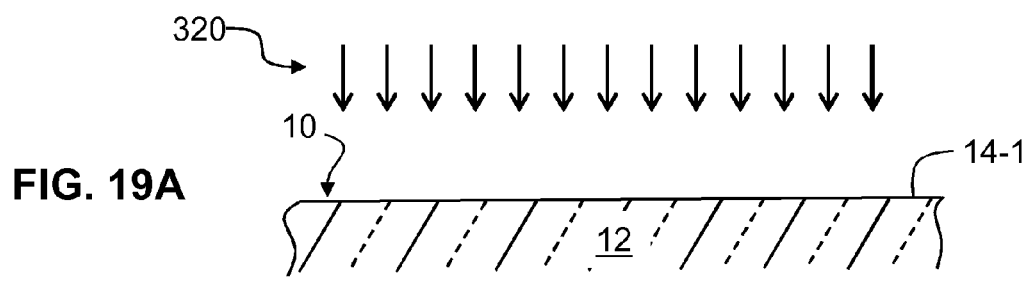
FIGS. 19A through 19F are simplified illustrations of embodiments of fabricating a DRAG structure using philic and phobic materials deposited on the transparent medium to form a phase structure.
Figure 19B:
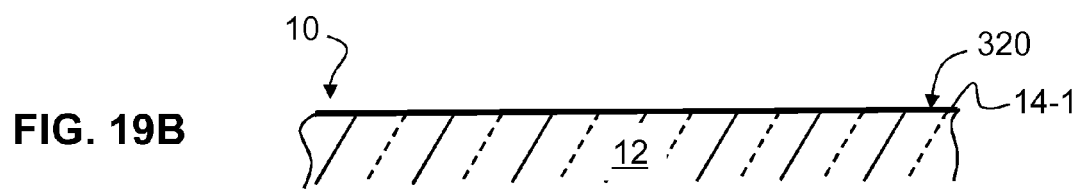

FIGS. 19A through 19F are simplified illustrations of embodiments of fabricating a DRAG structure using philic and phobic materials deposited on the transparent medium to form a phase structure. With reference to FIGS. 19A through 19F, another exemplary method of fabricating a DRAG structure 100 is provided. In FIGS. 19A and 19B, first surface 14-1 is optionally treated with a phobic material 320 (illustrated by arrows in FIG. 19A) rendering the surface non-wetting (i.e., increases the liquid contact angle and prevents liquid spreading) relative to a low-index coating material. An exemplary, non-limiting phobic material 320 is fluorosilane.

Figure 19C:
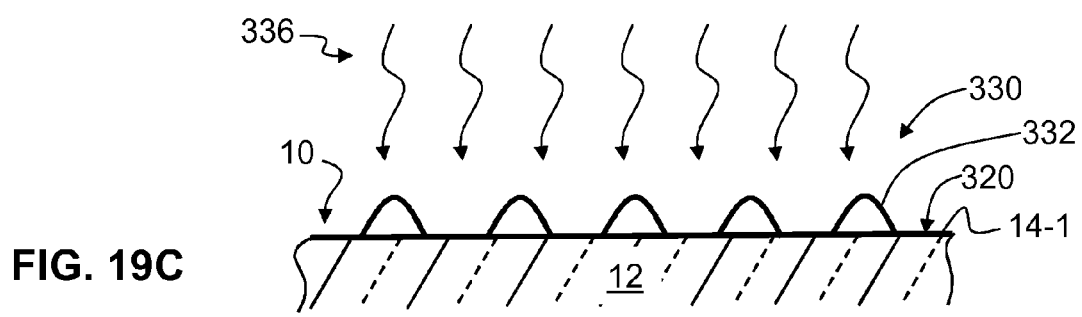

With reference to FIG. 19C, an ink-jet, stamping, dip-pen, or similar process may be used to form on the first surface 14-1 (and the thin layer of phobic material 320 thereon) an array 330 of low-index ($n_1$) droplets 332 approximately 10-100 microns in width and 0.1-5 microns in height. The droplets 332 are cured using, for example, UV or thermal curing, as illustrated in FIG. 19C in the form of curing energy 336.

Figure 19D:
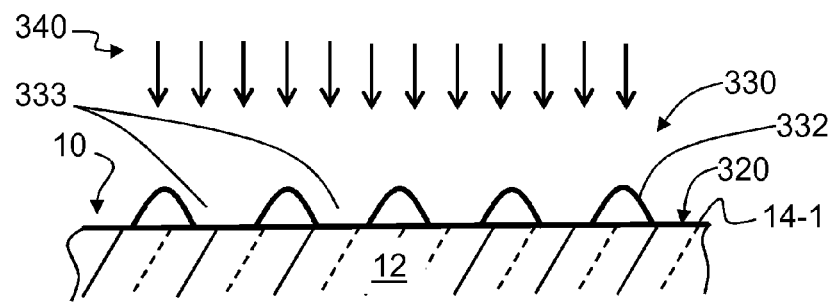

With reference now to FIG. 19D, the structure is subjected to a philic treatment 340 (as indicated by arrows) rendering the exposed portions of surface 14-1 as well as droplets 332 more philic (i.e., more wettable), using, for example, a plasma, UV ozone, or a corona treatment.

Figure 19E:
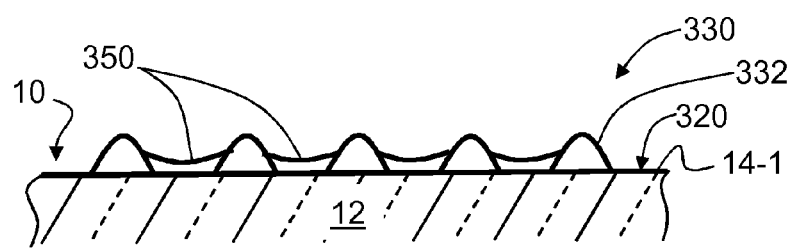
Figure 19F:
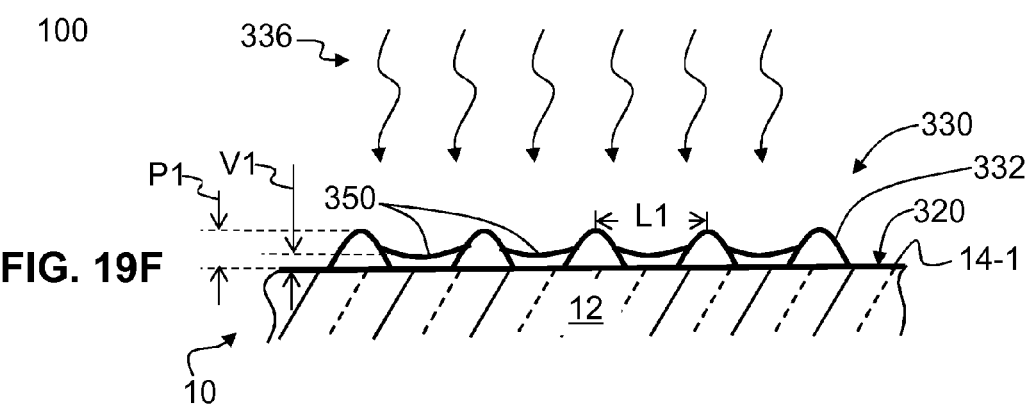

With reference to FIG. 19E, a final coating step may include depositing a high-index ($n_2$) coating 350, which may also be patterned using printing methods. Due to the wetting nature of spaces (valleys) 333 between droplets 332, the high-index coating 350 pools and wets the valleys 333 as shown. This may be followed by a final curing step as shown in FIG. 19F to form the final DRAG structure 100. FIG. 19F sets forth exemplary parameters that define the DRAG structure 100, such as lateral spacing between adjacent droplets 332 (peaks P), denoted L1, which may differ depending upon which droplets are being measured. Likewise, the peak height relative to substrate surface 14-1 is denoted P1 and the valley height relative to the substrate surface is denoted V1.

In some cases, the low-index droplets 332 may be designed such that they retain some non-wetting behavior, enabling a simpler (e.g., complete coverage, non-patterned) wet coating process to be used when depositing high-index coating (material) 350. However, this may involve trade-offs between a lower-cost coating process and a possibly less ideal optical structure.

Non-limiting examples of low-index coating materials for forming droplets 332 include fluoroacrylates, which have a refractive index in the range from about 1.3 to about 1.35. Non-limiting examples of high-index coating materials include hybrid organic-inorganic polystyrenes, nanoparticle-filled acrylates, sol-gels, and certain polyimides, wherein the refractive index is in the range from about 1.6 to about 1.9 and even beyond. In some cases, one or both of the low-index and high-index materials may be filled with nanoparticles to modify their mechanical properties, shrinkage, or refractive index. Examples of nanoparticles that have been used to fill polymer systems include, but are not limited to, $SiO_2$ (low index) and $TiO_2$ or $ZrO_2$ (high index).

The low-index-material regions may include some amount of porosity or hollow regions, either in some degree or in part. For example, the low-index regions may comprise a nanoporous sol-gel material, a nanoporous polymer material, or hollow nanospheres or microspheres made from various glasses, polymers, or other materials mentioned herein or known in the art.

Table 1 below sets forth select parameters for an exemplary DRAG structure 100, where the ambient external medium is air with $n_3=1$.

TABLE 1

Example parameters for DRAG Structure depicted in FIG. 19E

| L1 (μm) | $n_1$ | P1 (μm) | $n_2$ | V1 (μm) |
|---|---|---|---|---|
| 5-100 | 1.33 | 1.0 | 1.6 | 0.550 |
| 5-100 | 1.35 | 1.0 | 1.75 | 0.467 |
| 5-100 | 1.35 | 1.0 | 1.9 | 0.389 |
| 5-100 | 1.4 | 1.0 | 1.6 | 0.667 |
| 5-100 | 1.45 | 1.0 | 1.9 | 0.500 |
| 5-100 | 1.5 | 1.0 | 1.9 | 0.556 |
| 5-100 | 1.45 | 0.5 | 1.6 | 0.375 |

It is noted that there may be substantial error (e.g., +/−10%) in the peak and valley heights P1 and V1 while still allowing for the DRAG structure 100 to have reasonable AG and low-distortion performances. The lateral spacing L1 between peaks P may vary from 0.5 to 500 microns, or alternately from 5 to 100 microns as provided in Table 1 above. The allowable height (P1) error may be constrained by the rule that height P1 must be greater than height V1. The absolute magnitudes of heights V1 and P1 are not as important as the ratios between the heights, which are defined here by matching the optical path lengths: $P1 \cdot n_1 = V1 \cdot n_2 + (P1-V1) \cdot n_3$, where $n_3$ represents the index of the external ambient medium ($n_3=1$ for air). In an example, the heights V1 and P1 may be chosen such that the physical height difference P1−V1 is at least about 0.05 μm (constrained by the previous ratio) to retain appreciable scattering in reflection. This is a special case of the general structure described by equations 3 and 4.

The heights V1 and P1 are both measured from the bottom of valleys V, which are defined as the lowest interface of high-index material. Thus, these size-scale targets are not limited to any particular fabrication method. The transparent medium (substrate) 10 is considered to have a uniform optical path length at all points below the bottom of the lowest valley V in this case, and thus the substrate does not affect the optical path calculations.

Figure 20A:
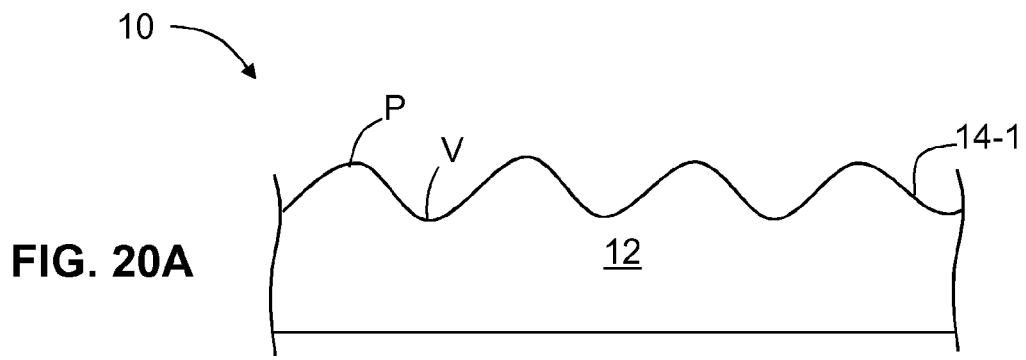
FIGS. 20A through 20C are simplified illustrations of further embodiments of fabricating a DRAG structure using preferential polishing of a conformal or semi-conformal layer.
Figure 20B:
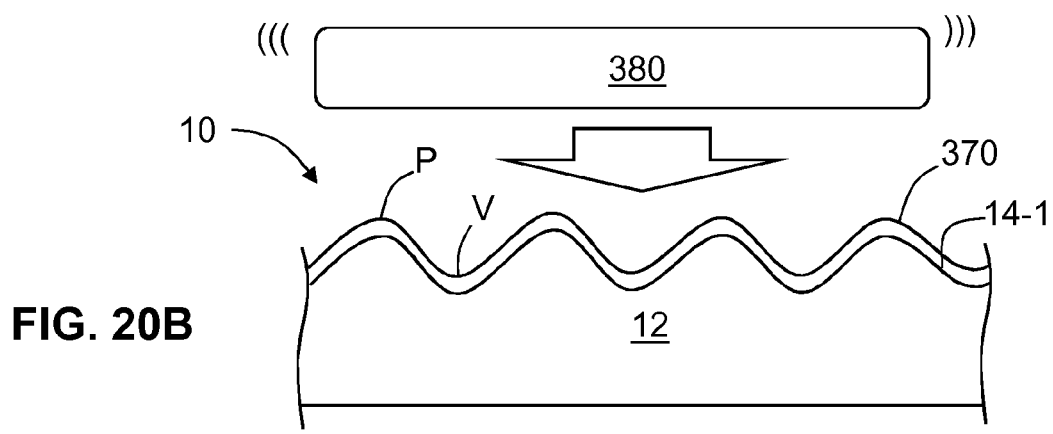
Figure 20C:
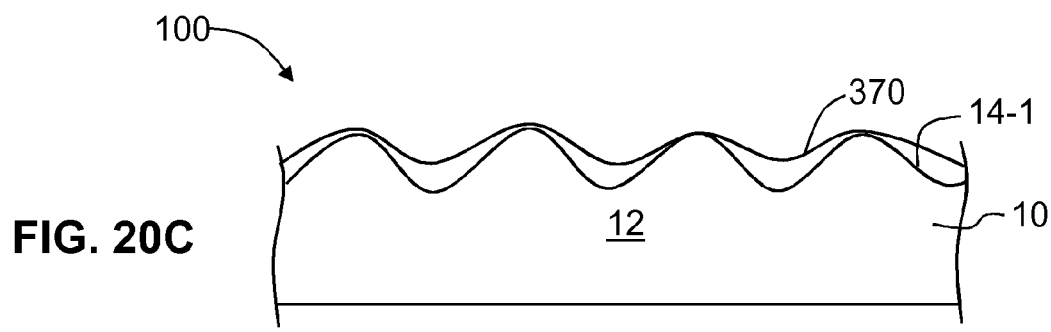

FIGS. 20A through 20C are simplified illustrations of further embodiments of fabricating a DRAG structure using preferential polishing of a conformal or semi-conformal layer. With reference to FIGS. 20A through 20C, another embodiment of fabricating DRAG structure 100 is provided.

With reference to FIG. 20A, a glass substrate 10 is provided with a rough first surface 14-1 through any of the many known methods such as etching, embossing, hot-molding, sandblasting, and the like. The glass substrate 10 may then be coated with a conformal or semi-conformal high-index coating 370. The coating method may include, for example, vapor coating, such as thermal evaporation, e-beam evaporation, DC or AC sputtering, or CVD methods, to name a few. The coating method may also comprise liquid coating methods such as spin coating, dip coating, or spray coating. The coating material may be an inorganic, a sol-gel, or a polymer. The material for coating 370 may include TiO, $ZrO_2$, $Al_2O_3$, $SiO_2$, acrylate polymers, polyimides or other previously mentioned materials.

After the conformal coating 370 has been applied to the rough surface 14-1 and optionally cured, a polishing step may be performed where a polishing pad 380 having a controlled softness or hardness (durometer) is selected. The polishing pad 380 is brought into contact with the conformal coating 370 (as shown by the large arrow) and is used to polish the structure using a controlled polishing pressure, so that peaks P of the structure in FIG. 20B are preferentially polished more than the valleys V. The polishing may be aided by a chemical agent, a liquid, an etching agent, or a particulate slurry. In this manner the high-index coating 370 becomes thinner at the peaks P and remains thicker in the valleys V, resulting in the DRAG structure 100 shown in FIG. 20C. In some embodiments, final target dimensions may be similar to those provided in previous examples.

In an additional embodiment for forming a DRAG structure 100, polymer phase-separating materials may be employed to create the refractive-index (phase) variation that provides for both the distortion-reduction and AG properties as described above. Exemplary polymer phase-separating materials are known in the art and may be used in such embodiments.

One method of producing a phase separation involves the controlled use of humidity or water to form microdomains in a drying polymer solution to cause the final polymer to have a controlled microstructure (see, e.g., the article by Gliemann, et al., "Nanostructure formation in polymer thin films influenced by humidity," *Surface and Interface Analysis* 39, no. 1 (2007): 1-8k, the entirety of which is incorporated herein by reference) whereby the phase-separated water leaves voids in the final structure. Such polymers include PMMA and PVB, which may be used as the low-index peak material in the present disclosure, followed by an overcoating with a high-index material made to be thicker in valleys V of the structure using the previously described or other methods.

A related alternative method involves the phase separation of two materials without significant water action. An exemplary system is the phase separation of $SiO_2$ and PMMA in a hybrid organic system starting from TEOS as a precursor to $SiO_2$ (see, e.g., the article by Silviera, et al., "Phase separation in PMMA/silica sol-gel systems," *Polymer* 36, no. 7 (1995): 1425-1434, the entirety of which is incorporated herein by reference).

In systems such as this with micron-scale separated phases, a solvent or an acid may be chosen that preferentially etches away the higher-index material, in this case PMMA, using plasma or an organic solvent. Plasma treatments and various solvents (e.g., acetone) will readily attack PMMA at a faster rate than they do $SiO_2$.

Of course, this etching method is not limited to strictly "phase-separating" systems. A micro-domain structure may also be created, for example, by mechanically blending thermoplastic polymers at a high temperature. An exemplary system may be a blend of a fluoropolymer with a polyimide (or polyamide, polyester, polycarbonate, polyketone, or the like). Solvents may be readily found (e.g., certain ketones) that preferentially attack the higher index (non-flourinated) polymer in such a system, thus providing a route to create films or surfaces where the high-index material is selectively thinned relative to the low-index fluoropolymer material. See, e.g., U.S. Pat. No. 6,117,508 to Parsonage, et al., entitled "Composite articles including a fluoropolymer blend," the entirety of which is incorporated herein by reference.

Figure 21A:
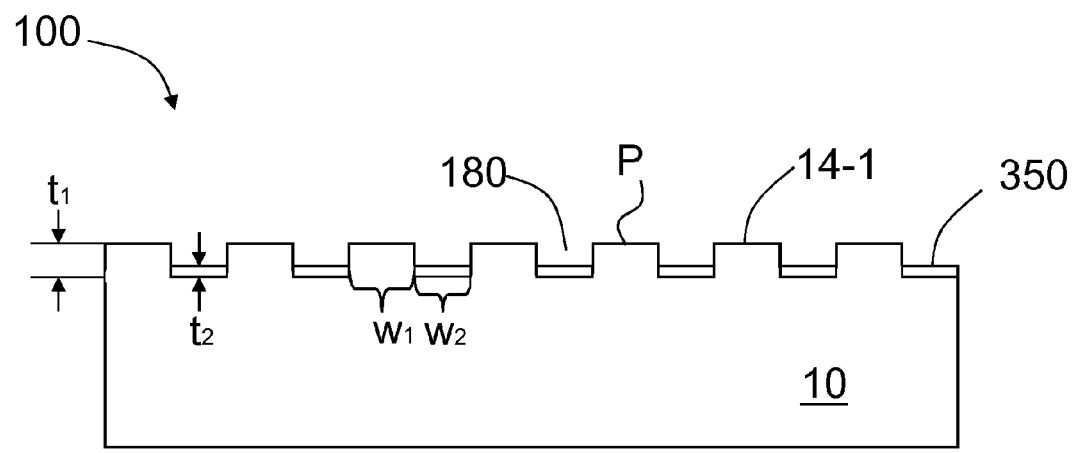
FIGS. 21A and 21B are cross-sectional views of exemplary DRAG structures formed to satisfy the phase-matching conditions for reduced distortion.
Figure 21B:
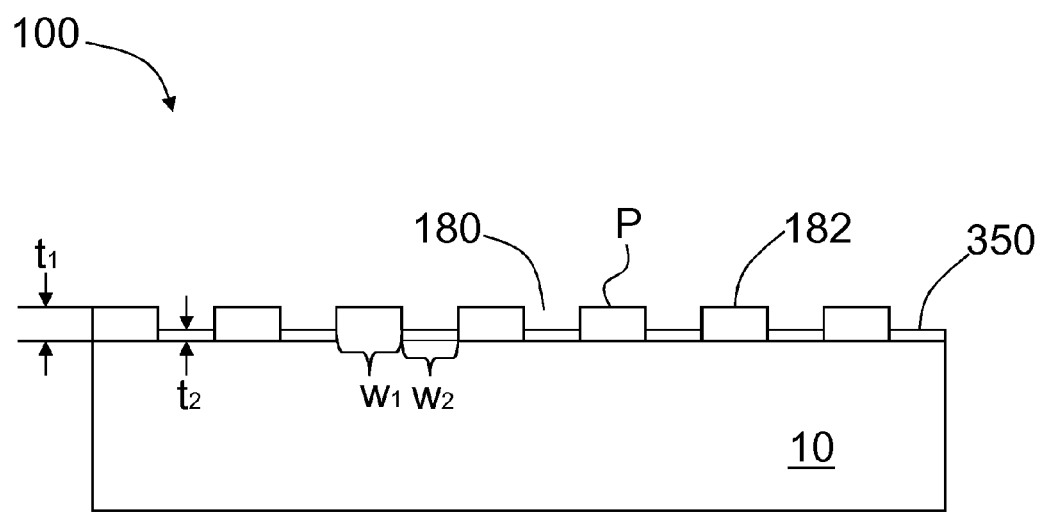
Figure 22A:
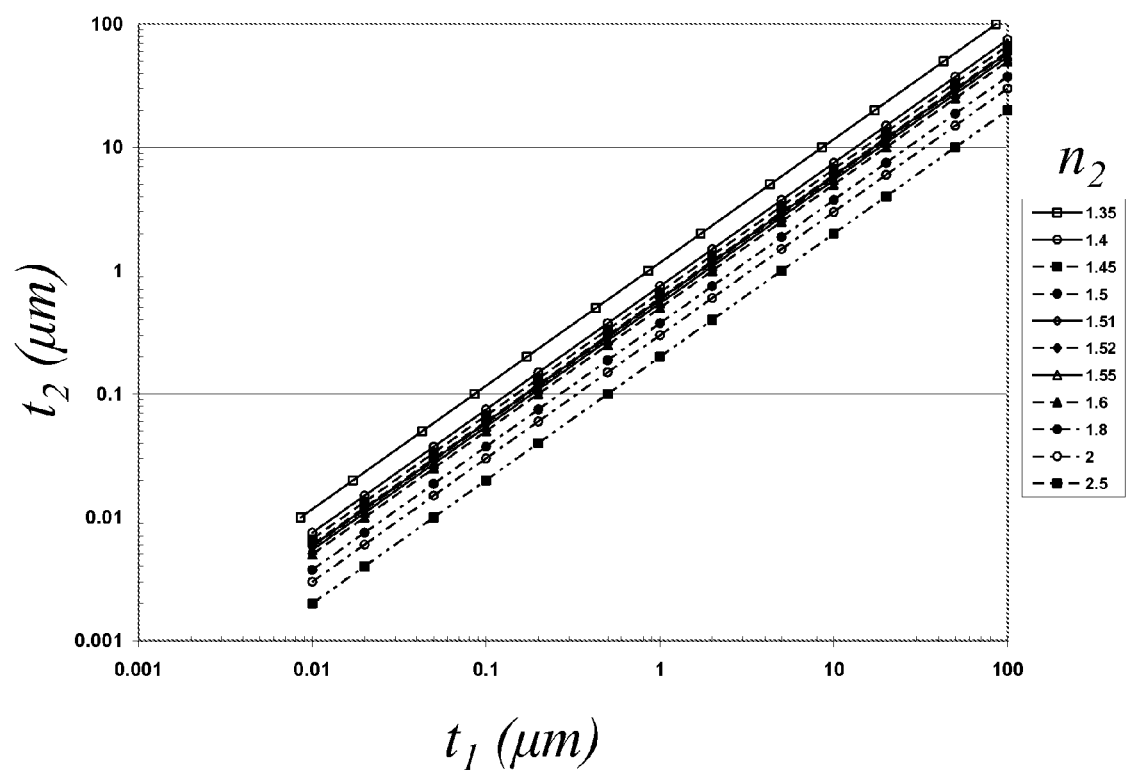
FIGS. 22A through 22D are plots of high-index film thickness $t_2$ (μm) versus raised feature (pillar) height $t_1$ (μm) for various values of $n_2$ and $n_1$ for the DRAG structures of FIGS. 21A and 21B.
Figure 22B:
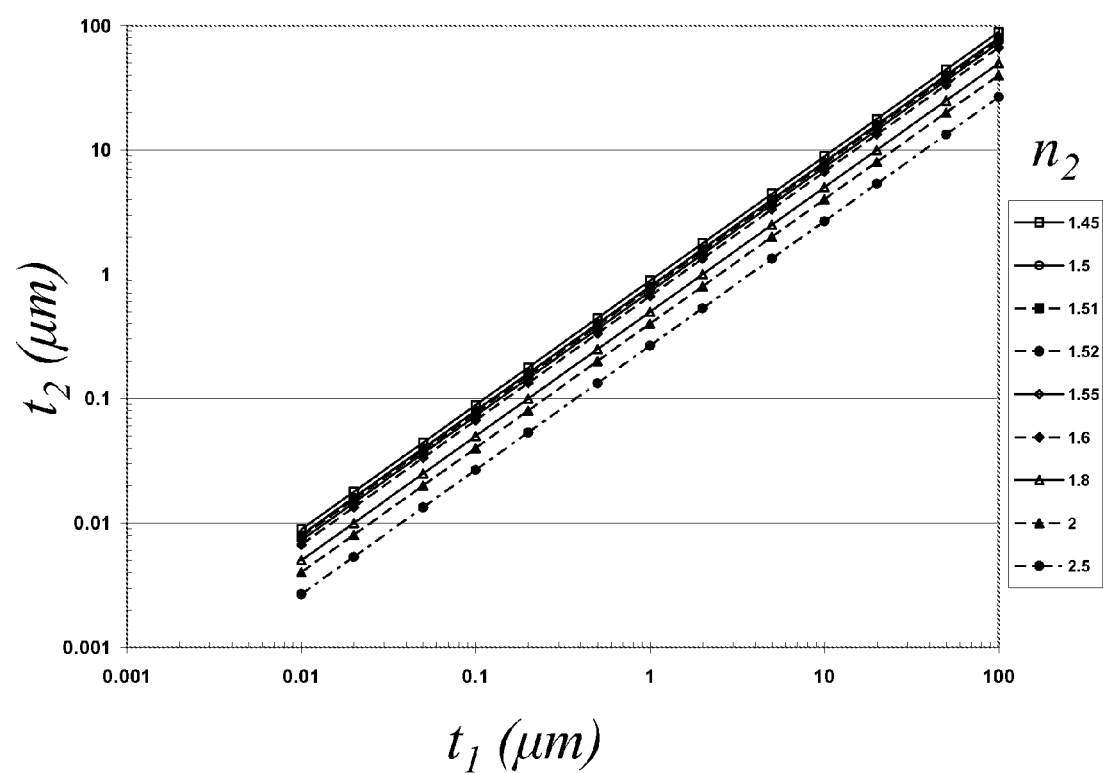
Figure 22C:
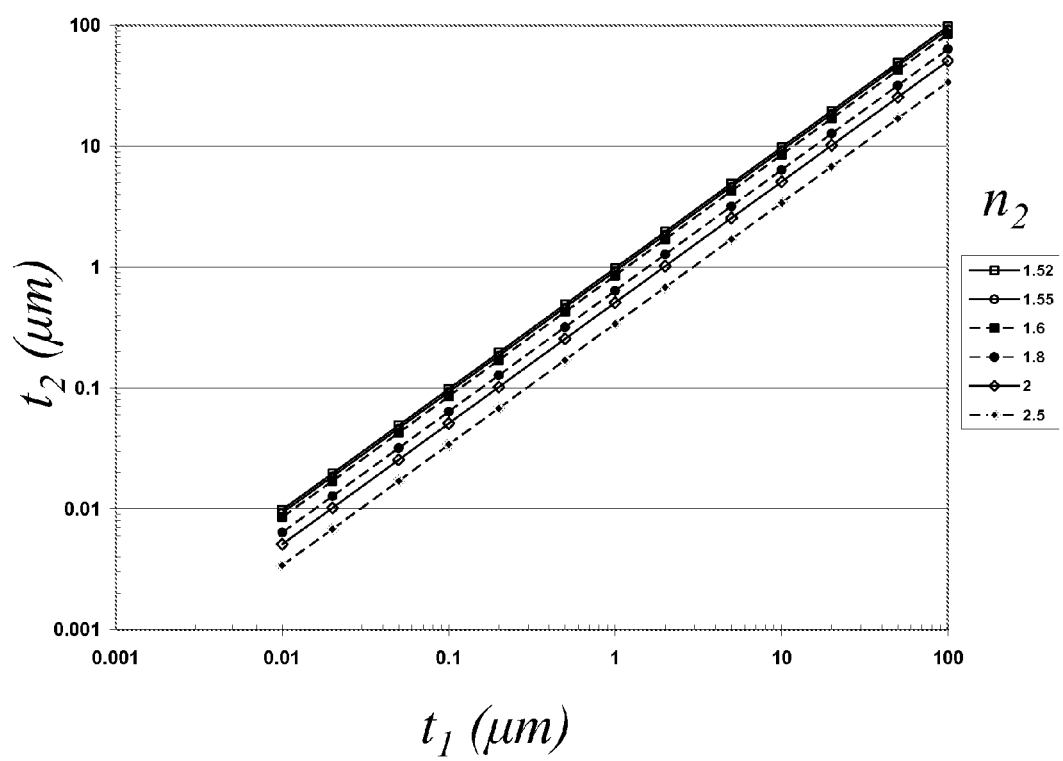
Figure 22D:
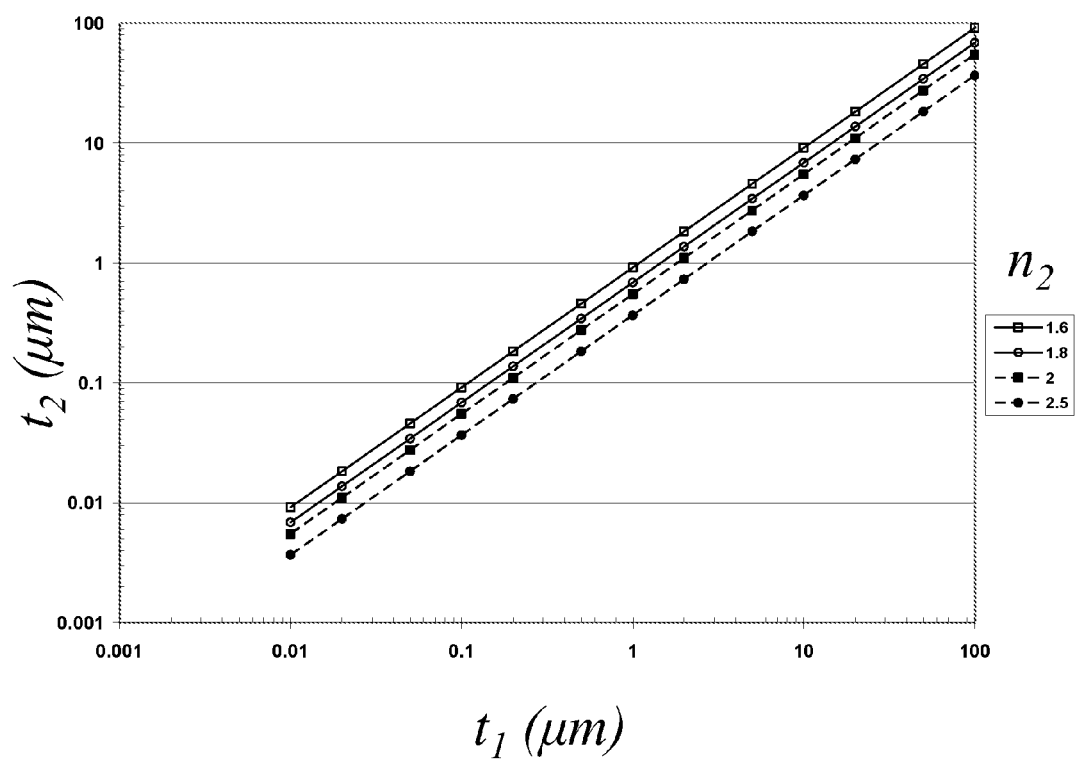

FIGS. 21A and 21B are cross-sectional views of exemplary DRAG structures formed to satisfy the phase-matching conditions for reduced distortion. With reference to FIG. 21A, an exemplary DRAG structure 100 is illustrating including a glass substrate 10 wherein a surface 14-1 has formed therein depressions 180 (such as are formed using the approach of FIG. 16D) filled with high-index material 350, such as polymer, sol-gel, glass, etc. The high areas of the surface 14-1 are constituted by the glass substrate 10 and define pillars or peaks P, which are shown by way of illustration as being binary (sharp-edged with two discrete levels), but which may also be smooth (diffuse or rounded) in form. FIG. 21B is similar to FIG. 21A except that depressions 180 are defined by adding a low-index coating 380 to glass substrate surface 14-1 to define raised features 182 that are also identified as pillars or peaks P.

By way of example, a glass substrate 10 may comprise a laminate structure or is strengthened (e.g., by ion-exchange or by a thermal process) and has an index of $n_g$. The width of depressions 180 may be defined by W2 while the width of low-index raised features 182 may be defined by W1. The height and refractive index of high-index material 350 within the depressions 180 are given by $t_2$ and $n_2$, respectively, while the height and refractive index of low-index raised features 182 are given by $t_j$ and $n_1$. It is noted that the DRAG structures 100 of FIGS. 21A and 21B are shown as being rectangular and periodic for ease of illustration and should not limit the scope of the claims appended herewith. Smooth or aperiodic (e.g., random or quasi-random) configurations may also be formed. The index of the medium above the structure is $n_3$, e.g., air. In some cases, $n_1$ of the low-index raised features 182 may be the same as the substrate $n_g$, as in FIG. 21A, but in other cases $n_1$ may be different from $n_g$ (as in FIG. 21B).

Exemplary widths W1 and W2 may be in the range between 0.5 μm and 100 μm, and in a particular example are in the range between 5 μm and 50 μm. Regular patterns with periods less than an optical wavelength provide substantially no scattering thereby placing a lower limit on the feature size. Once the features become large enough to be directly resolvable by the human eye, they may be less desirable for aesthetic reasons.

The parameters $n_1$, $t_1$, $n_2$, $t_2$ and $n_3$ are related by the following equations based on the equality of the optical paths:

$$n_1 \cdot t_1 = n_2 \cdot t_2 + (t_1 - t_2) \cdot n_3 \qquad \text{Eq. A}$$

$$t_2 = t_1 \cdot (n_1 - n_3)/(n_2 - n_3) \qquad \text{Eq. B}$$

It should be noted that Eqs. A and B above represent a special case of the earlier Eqs. 3 and 4, with a specifically defined geometry, where in this case the constant c in Eq. 4 is precisely equal to the minimum value term in Eq. 4. Equations A and B also set the conditions for correction of the optical paths; however, good AG and distortion-reducing performance may be obtained even when the optical paths are not identical, i.e., identically corrected. In various examples, the optical paths are corrected to better than (i.e., equal to or less than) the aforementioned ΔOPD values of ½λ, ¼λ or ⅛λ. The amount of optical path correction may depend on the size of the object being viewed through the DRAG structure 100, with smaller objects requiring a higher degree of optical path correction.

Table 2 below sets forth some exemplary materials for use in forming a DRAG structure 100 with their refractive index values.

TABLE 2

Examplary materials

| Material | $n_D$ @ 20° C. |
| --- | --- |
| poly[4,5-difluoro-2,2-bis(trifluoromethyl)-1,3-dioxole-co-tetrafluoro ethylene] | 1.2900 |
| poly(2,2,3,3,3-pentafluoropropyl acrylate) | 1.3890 |
| poly(trifluoroethyl acrylate) | 1.4070 |
| poly(methylsilsesquioxane) | 1.4200 |
| poly(ethyl acrylate) | 1.4685 |
| poly(methyl acrylate) | 1.4790 |
| Poly(methyl methacrylate) | 1.4914 |
| poly(2-chloroethyl methacrylate) | 1.5170 |
| poly(phenylsilsesquioxane) | 1.5600 |
| Poly(benzyl methacrylate) | 1.5680 |
| poly(phenyl methacrylate) | 1.5706 |
| poly(styrene) | 1.5920 |
| poly(vinylidene chloride) | 1.6000 |
| poly(2-chlorostyrene) | 1.6098 |
| poly(p-xylylene) | 1.6690 |
| poly(pentabromophenyl methacrylate) | 1.7100 |
| $TiO_2$—$SiO_2$ sol-gel | 1.7500 |
| $TiO_2$—$SiO_2$ sol-gel | 1.8000 |
| $TiO_2$—$SiO_2$ sol-gel | 1.9000 |
| Corning Eagle XG ® glass | 1.51 |
| Corning Gorilla ® glass | 1.51 |
| soda-lime | 1.52 |

FIGS. 22A through 22D are plots of high-index film thickness $t_2$ (μm) versus raised feature (pillar) height $t_1$ (μm) for various values of $n_2$ and $n_1$ for the DRAG structures of FIGS. 21A and 21B. With reference to FIGS. 22A through 22D, plots of high-index film thickness $t_2$ (μm) vs. raised feature (pillar) height $t_1$ (μm) for various values of $n_2$ and $n_1$ are provided based on Eq. A and Eq. B. The refractive index $n_1$ of the raised features for FIGS. 22A through 22D is 1.3, 1.4, 1.51 and 1.55, respectively.

Figure 23A:
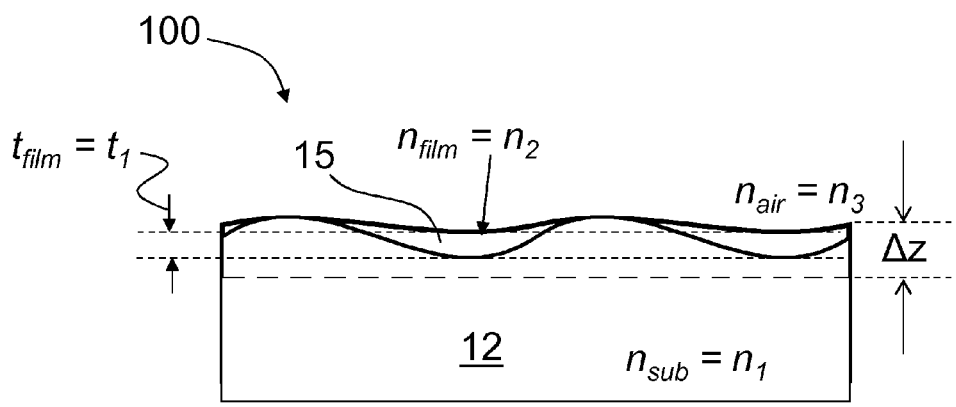
FIG. 23A is a cross-sectional view of an exemplary DRAG structure that is the analog version of the binary structure shown in FIG. 21B.
Figure 23B:
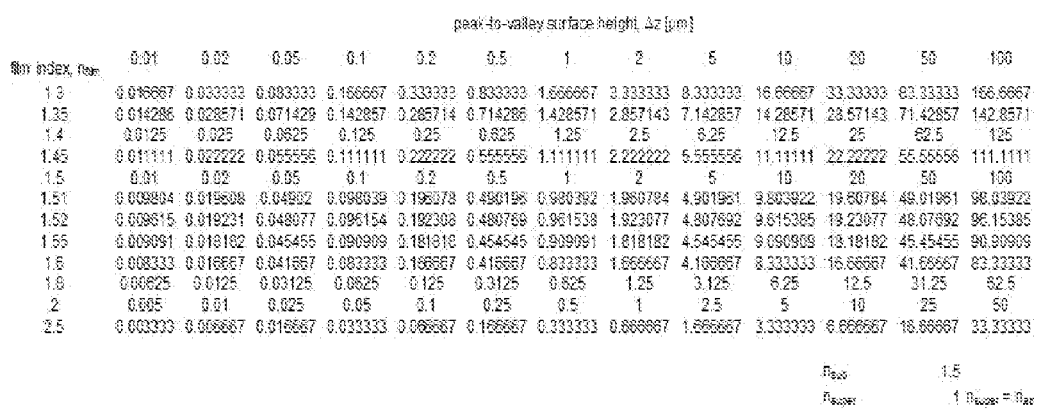
FIG. 23B is a table of exemplary phase-matching data for the DRAG structure of FIG. 23A.

FIG. 23A is a cross-sectional view of an exemplary DRAG structure that is the analog version of the binary structure shown in FIG. 21B. FIG. 23B is a table of exemplary phase-matching data for the DRAG structure of FIG. 23A. With reference to these figures, in the case where the first surface 14-1 of the substrate 12 and the second surface 14-2 of the transparent layer 14 vary smoothly, as shown in FIG. 23A, Eq. A and Eq. B may be expressed as Eq. A' and Eq. B':

$$n_{sub} \times \Delta z = n_{film} \times t_{film} + (\Delta z - t_{film}) \times n_{super} \quad \text{[Eq. A']}$$

$$t_{film} = \frac{(n_{sub} - n_{super})}{(n_{film} - n_{super})} \times \Delta z \quad \text{[Eq. B']}$$

Equations A' and B' may be used to perform analogous calculations as those performed using Eq. A and Eq. B. FIG. 23B sets forth a table of example phase-matching data for the DRAG structure of FIG. 23A.

With respect to the variation of optical path length (OPL), it is noted that the transmission of a rough surface may improve for any amount of high-index film on the substrate 10, as long as the rough surface is in the appropriate locations and leads to a reduction in the differences of OPL across the surface of the substrate. An optimum scenario may be matching the OPL across the substrate 10. If the film is thicker than the optimum scenario, the transmission will begin to degrade but will still be better than the uncoated rough surface (as long as the film thickness follows that as prescribed in the application). One skilled in the art could measure the optical path difference across the substrate (for areas of interest, in some cases greater than 1 pixel, but smaller than the entire display), by using an interferometer to characterize the OPL on transmission.

Performance Comparison of AG and Non-AG Structures

Figure 24A:
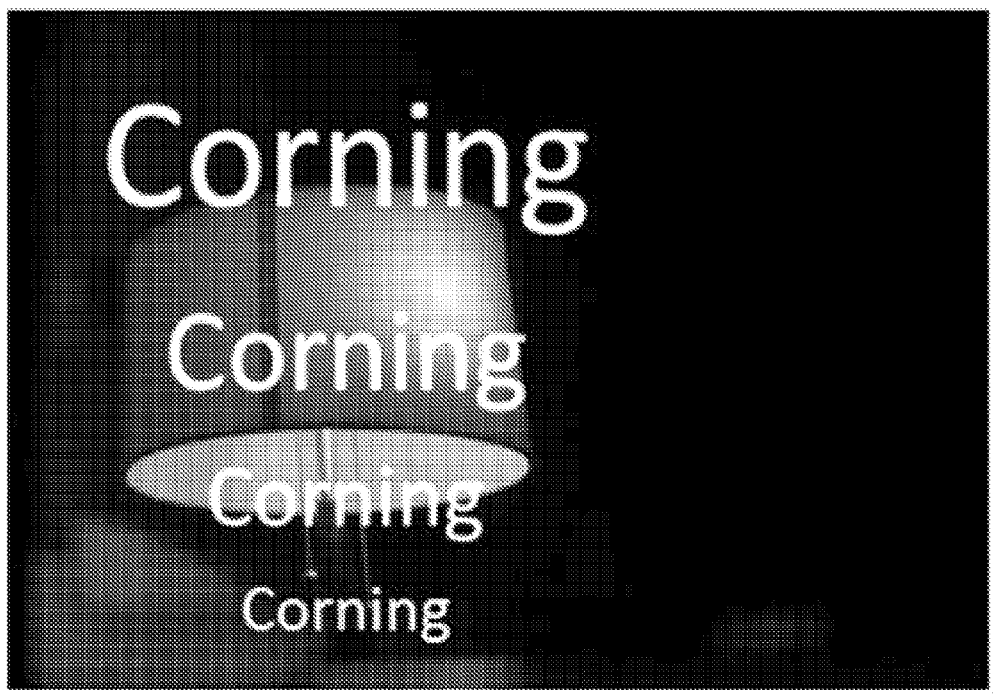
FIGS. 24A through 24E are depictions that illustrate the essential effect of a non-AG transparent sheet (FIG. 24A), a conventional AG transparent sheet (FIGS. 24B, 24C) and a DRAG transparent sheet as disclosed herein (FIGS. 24D, 24E).
Figure 24B:
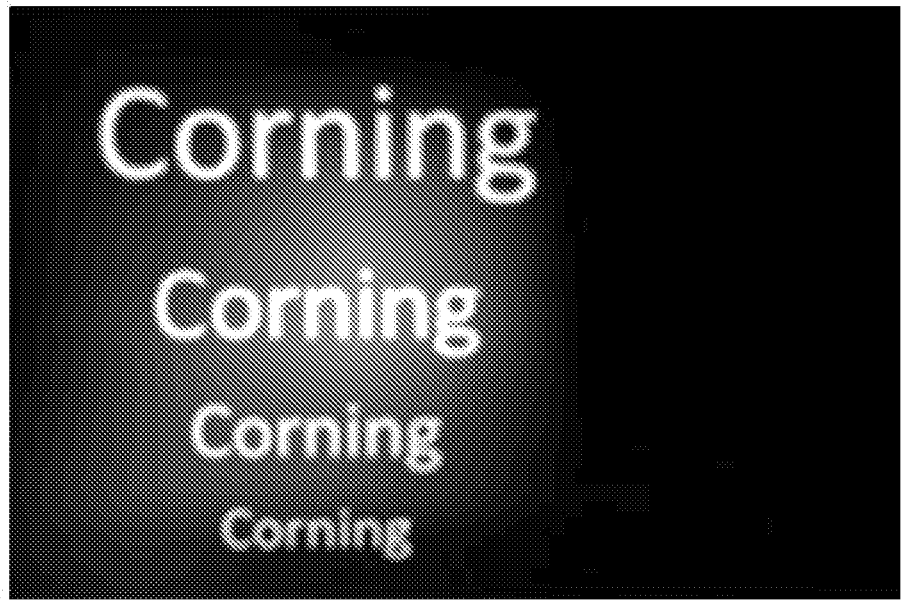
Figure 24C:
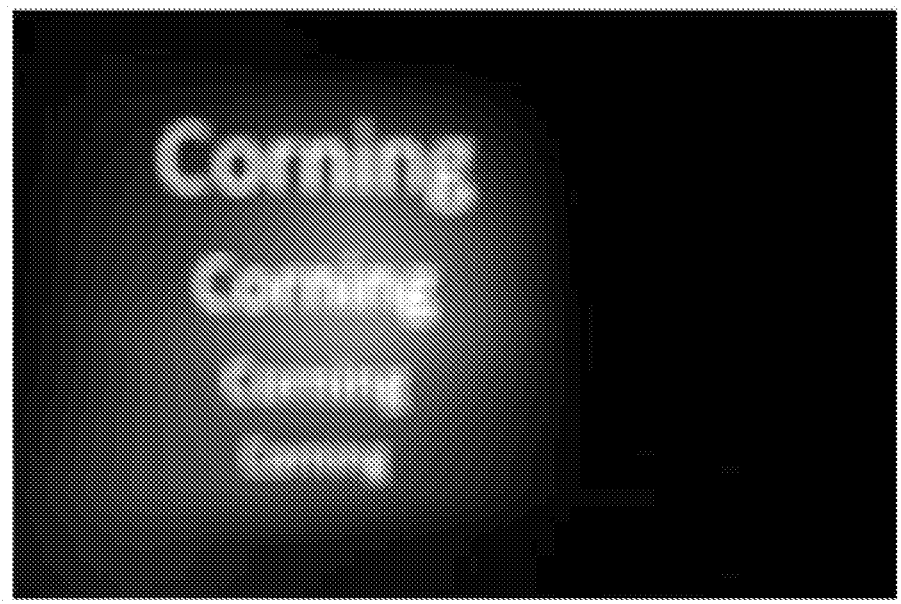
Figure 24D:
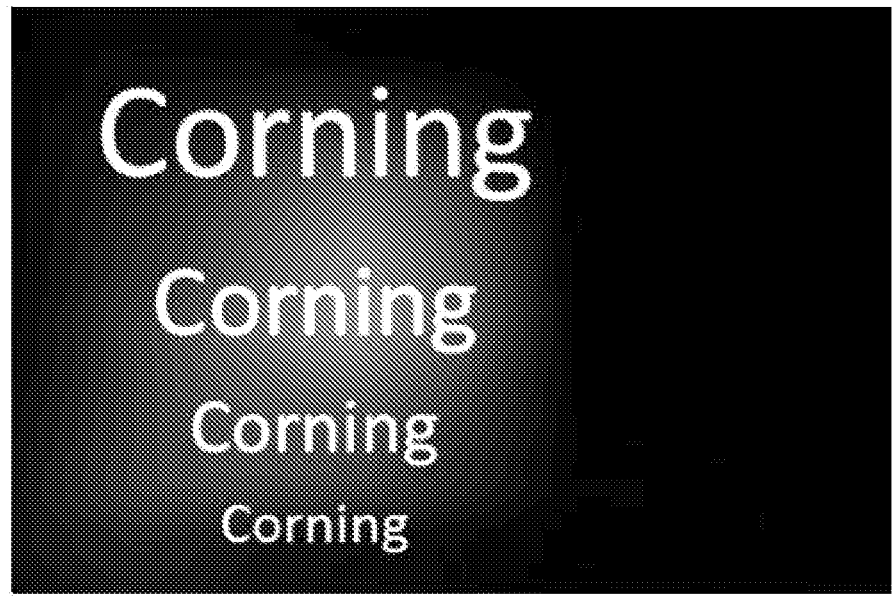
Figure 24E:
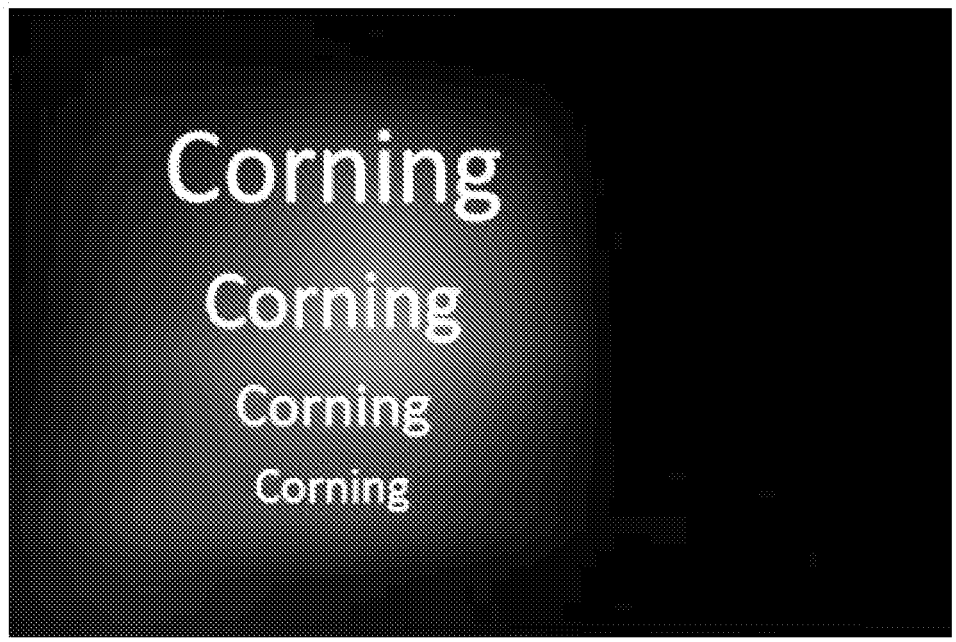

FIGS. 24A through 24E are depictions that illustrate the essential effect of a non-AG transparent sheet (FIG. 24A), a conventional AG transparent sheet (FIGS. 24B, 24C) and a DRAG transparent sheet as disclosed herein (FIGS. 24D, 24E). With reference to these figures, FIG. 24A is based generally on the arrangement of FIG. 1 and FIG. 3, where the substrate 10 is a glass substrate having no AG surface, whether conventional or as disclosed herein. Test objects 30 include four white-on-black words "Corning" of different sizes and at an object distance DO from substrate lower surface 18 (i.e., the object is not in direct contact with the substrate back surface). The light source 24 is a lamp. FIG. 24A shows that the objects 30, when viewed through a non-AG substrate 10, are unblurred and thus have essentially no distortion. However, the light source 24 presents very strong glare, to the point where the type of lamp is clearly visible in the reflection, which is what one would expect from the planar substrate surfaces 13 and 18.

FIG. 24B shows the same text objects 30 when viewed through a standard AG substrate 10 having a standard AG surface 14. The glare from the light source 24 is now diffused, but the objects 30 are now slightly blurred. In FIG. 24C, object distance DO is increased, which increases the blurring as the impact of the phase distortion becomes more pronounced. FIG. 24D utilizes a DRAG structure 100 and the text of objects 30 subsequently looks clearer than the comparable image in FIG. 24B for the conventional AG surface. FIG. 24E is similar to FIG. 24D but with an increased object distance DO. In FIG. 24E, the text of objects 30 remains clear and unblurred because of the phase compensation (i.e., the amount of distortion is reduced as compared to that of FIG. 24B), while the amount of glare remains the same and is comparable to that of a standard AG surface.

Reducing Sparkle

As discussed above, sparkle is a significant problem during the design of AG surfaces and may be a limiting factor in making DRAG structure 100. When AG structures are used for pixelated displays such as LCDs or OLEDs, the AG surface roughness may act like a microlens array and locally concentrate light. As a consequence, some pixels of the display may appear brighter than others and give the display an overall impression of having a sparkly surface.

When an AG structure is used in a flat-panel display, sparkle may become significant under one or more of the following situations:

When the RMS roughness of the AG surface is relatively large, e.g., greater than 100 nm;

When the spatial periods of the surface roughness are relatively large, e.g., between 50 microns and 150 microns;

When the AG surface is too far from the object, and in the case of a display, farther than 1 mm or 5 mm from the image-forming plane of the display, depending on the pixel size of the display;

When the pixels of the display are small, e.g., less than 200 microns;

When the angular extent of the eye pupil is small, e.g., less than 20 mrad; and/or When the pixel fill fraction is less than 90%.

Although the first two situations listed above may be controlled to some extent, the remaining situations depend largely upon the particulars of the display and viewing conditions. A conventional approach to minimizing sparkle arising from AG surfaces is to control the surface parameters in such a way as to optimize haze and distinctness-of-image (DOI) targets. While this approach is useful for certain types of displays with relatively large pixels, its usefulness diminishes with smaller displays that utilize relatively small pixels, as these small pixels may lead to dramatically increased sparkle.

One embodiment of the present disclosure places identical rough surfaces of thickness t on each side of the cover glass. If the two rough interfaces are perfectly registered to each other, the image will propagate through exactly the same total amount of air and glass no matter where one looks on the rough surface. However, when viewed at an angle, the two surfaces will no longer coincide and sparkle will reappear. The critical angle is given by the ratio of the auto correlation length of the surface $L_c$ and the glass thickness t and typically would be less than 5°. Also, if the back side of the surface is filled with an index-matching layer, it would no longer be possible to eliminate sparkle in this way.

Figure 25:
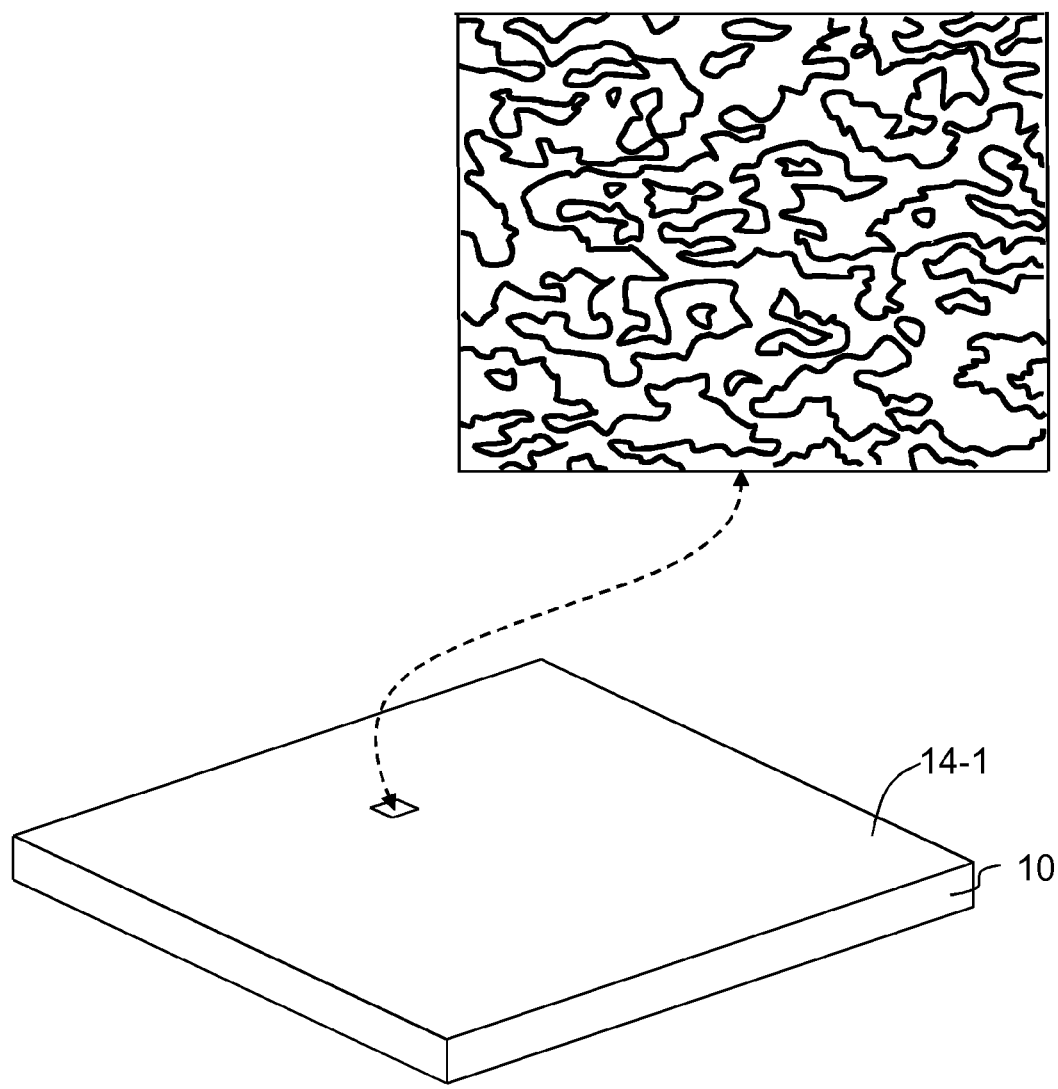
FIG. 25 is a perspective and close-up view of an exemplary substrate having a random surface used to reduce sparkle.

FIG. 25 is a perspective and close-up view of an exemplary substrate having a random surface used to reduce sparkle. With reference to FIG. 25, another exemplary approach may include using a random "binary" surface 14-1, like the one shown in FIG. 25. Here a "binary" surface refers to a rough surface with two plateaus, a peak plateau and a valley plateau, without a random distribution of heights. The lateral feature spacing appears random but in actuality has an engineered frequency content to control or reduce sparkle.

Such exemplary structures may be fabricated using photolithographic masking and etching of a glass surface. The following exemplary program provides a method of designing such a random surface 14-1. Two parameters of note are frequency cut off, which corresponds to the $1/e^2$ period of the filter used in the Fourier space, and amplitude, which corresponds to the etching depth.

Exemplary Program

```
function bb=fonc_generate_surface_binary(nl,nc,periodl,periodc)
%periodc corresponds to frequency cut at 1/e2
% define a random surface
aa=rand(nl,nc);
aa=aa-mean(mean(aa));
% calculate Fourier transform of the random surface
aafft=fftshift(fft2(aa));
% multiply by a gaussian function in the Fourier space
aafft=aafft.*fonc_gauss(nl,nc,nl/periodl,nc/periodc);
% take the real part of the inverse Fourier transform
bb=(real(fft2(fftshift(aafft))));
% substract average
bb=bb-mean(mean(bb));
%Binarise the surface
bb=bb/max(max(bb));
bb=(sign(bb-0.0)+1)/2;
```

The choice of frequency cut off will determine the angle at which light will be scattered. In some embodiments, the cut off period should be somewhere between 10 and 40 microns, depending on the application. Certain aspects of this and other embodiments may also be implemented by a general purpose computer programmed in accordance with the principles discussed herein. Such certain embodiments and the associated functional operations may be implemented in digital electronic circuitry or in computer software, firmware, or hardware. Such embodiments may be implemented as one or more computer program products, i.e., one or more modules of computer program instructions encoded on a tangible program carrier for execution by, or to control the operation of, a data processing apparatus or processor. The tangible program carrier may be a computer readable medium. The computer readable medium may be a machine-readable storage device, a machine-readable storage substrate, a memory device, or a combination of one or more of them. Exemplary processors encompass all apparatus, devices, and machines for processing data, including by way of example a programmable processor, a computer, or multiple processors or computers. The processor may include, in addition to hardware, code that creates an execution environment for the computer program in question, e.g., code that constitutes processor firmware, a protocol stack, a database management system, an operating system, or a combination of one or more of them.

Figure 26:
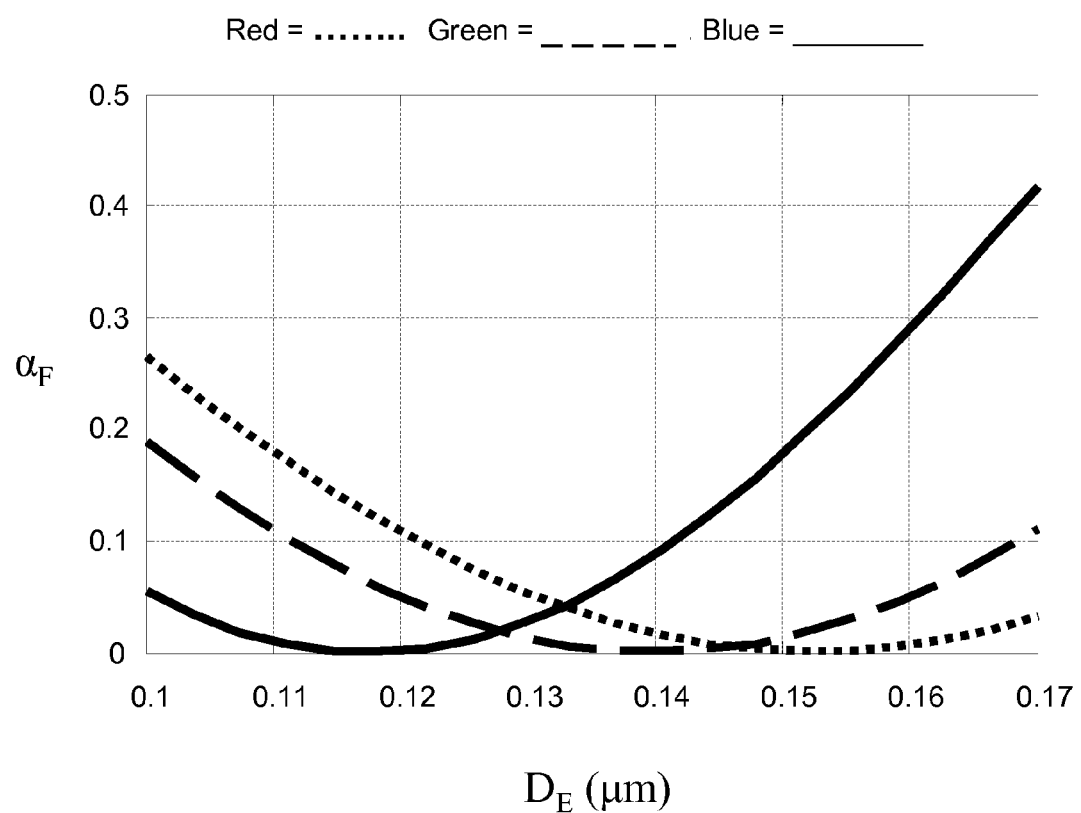
FIG. 26 is a plot of specular reflection attenuation factor $\alpha_F$ as a function of etching depth $D_E$ (μm) as calculated at wavelengths of 0.61 microns (Red), 0.56 microns (Green) and 0.47 microns (Blue).

In terms of etching depth, it may be shown that to eliminate specular reflection the etching depth needs to be equal to a quarter of the wavelength. Therefore, a compromise should be made since light sources are usually polychromatic and may not be possible to eliminate specular reflection for all wavelengths at the same time using this binary structure approach. FIG. 26 is a plot of specular reflection attenuation factor $\alpha_F$ as a function of etching depth $D_E$ (µm) as calculated at wavelengths of 0.61 microns (Red), 0.56 microns (Green) and 0.47 microns (Blue). With reference to FIG. 26, since the human eye is much less sensitive to blue, an optimal etching depth is the one that eliminates green and partly eliminates red. Based on this condition, from the plot of FIG. 26, an example ideal etching depth $D_E$ is about 0.14 microns.

Despite the drawback of wavelength sensitivity, this binary structure approach may have the advantage of significantly reducing sparkle without the need for a separate distortion-reducing layer. However, this binary structure may also be combined with a separate distortion-reducing layer in the valleys of the structure, according to the previously described principles and examples. While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous.

As shown by the various configurations and embodiments illustrated in the figures, various embodiments for anti-glare and anti-sparkle transparent structures with reduced optical distortion have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. An anti-glare light-transmitting structure that reduces an amount of glare from reflected ambient light and that has reduced optical distortion for light of wavelength $\lambda$ transmitted through the light-transmitting structure, comprising:
    a first transparent medium having a first refractive index $n_1$ and a light-scattering first surface that reduce glares and that by itself introduces an amount of distortion to the transmitted light; and
    a second transparent medium having a second refractive index $n_2$ and a second surface that defines an interface to an ambient environment having a refractive index $n_3$, wherein $n_2 > n_1 > n_3$, and with the second transparent medium residing atop of and at least partially covering the first surface to reduce the amount of distortion introduced by the first surface; and
    wherein the first surface has a first surface shape $h_1(x,y)$, the second surface has a second surface shape $h_2(x,y)$, and $h_2(x,y)$ is within 50% of $(n_2-n_1)/(n_2-n_3) \cdot h_1(x,y)+c$, where c is a constant.

2. The anti-glare light-transmitting structure of claim 1, wherein the first and second transparent mediums act to maintain a relative phase difference of the transmitted light of $\frac{1}{2}\lambda$ or less.

3. The anti-glare light-transmitting structure of claim 2, wherein the relative phase difference is $\frac{1}{4}\lambda$ or less.

4. The anti-glare light-transmitting structure of claim 1, wherein the first surface includes peaks and valleys, and wherein the second transparent material has a thickness within the valleys that is greater than a thickness on the peaks.

5. The anti-glare light-transmitting structure of claim 1, wherein the second transparent medium resides only within the valleys.

6. The anti-glare light-transmitting structure of claim 5, wherein the valleys are defined by substantially vertical sidewalls.

7. An anti-glare light-transmitting structure that reduces an amount of glare from reflected ambient light and that has reduced optical distortion of light of wavelength $\lambda$ transmitted through the light-transmitting structure, comprising:
    a first transparent medium having a first refractive index $n_1$ and a first surface that defines an interface to an ambient environment having a refractive index $n_3$, wherein the first surface constitutes a light-scattering anti-glare surface comprising peaks and valleys that introduces an amount of distortion to the transmitted light; and
    a plurality of ion-diffused regions of refractive index $n_2 > n_1 > n_3$ formed in the valleys that serve to reduce the amount of distortion in the transmitted light.

8. A method of forming an anti-glare light-transmitting structure that reduces an amount of glare from reflected ambient light and that has reduced optical distortion of light of wavelength $\lambda$ transmitted through the light-transmitting structure, comprising:
    forming, on first transparent medium having a first refractive index $n_1$, a light-scattering anti-glare first surface that by itself introduces an amount of distortion to the transmitted light; and
    adding a second transparent medium to the first surface of the first transparent medium, the second transparent medium having a second refractive index $n_2$ and a second surface that interfaces with an ambient environment having a refractive index $n_3$, wherein $n_2 > n_1 > n_3$, with the second transparent medium covering at least a portion of the first surface to reduce the amount of distortion in the transmitted light, and
    wherein the light-scattering anti-glare first surface includes peaks and valleys, and wherein the second transparent medium does not cover the peaks.

9. The method of claim 8, including forming the light-scattering anti-glare first surface by at least one of etching, stamping, embossing, molding, replicating, and imprinting.

10. The method of claim 8, wherein adding the second transparent medium to the first transparent medium comprises depositing particles of the second transparent medium into the valleys.

11. The method of claim 8, wherein adding the second transparent medium to the first transparent medium comprises spin-coating the second transparent medium onto the first surface.

12. The method of claim 8, wherein adding the second transparent medium to the first transparent medium comprises:
    adding the second transparent medium to the valleys as a liquid that forms a meniscus shape with each valley; and
    allowing or causing the liquid to harden while maintaining the meniscus shapes.

13. The method of claim 8, wherein adding the second transparent medium to the first transparent medium comprises:
    depositing a layer of phobic material on the first surface;
    removing the layer of phobic material from the valleys but not the peaks;
    adding the second transparent medium to the valleys; and
    removing the phobic material from the peaks.

14. The method of claim 8, wherein adding the second transparent medium to the first transparent medium comprises:
    depositing a layer of the second transparent medium on the first surface; and
    polishing the layer of the second transparent medium so that more of the material remains in the valleys than on the peaks.

15. The method of claim 8, wherein the first and second transparent mediums define an optical path difference for the transmitted light that is $\frac{1}{2}\lambda$, or less.

16. A method of forming an anti-glare light-transmitting structure that reduces an amount of glare from reflected ambient light and that has reduced optical distortion of light of wavelength $\lambda$ transmitted through the light-transmitting structure, comprising:
    forming a transparent medium having a first refractive index $n_1$ and a light-scattering anti-glare first surface having peaks and valleys that by itself introduces an amount of distortion to the transmitted light; and adding ion-diffused regions to the first transparent medium, the ion-diffused regions having a second refractive index $n_2$ and a second surface that interfaces with an ambient environment having a refractive index $n_3$, wherein $n_2 > n_1 > n_3$, with the ion-diffused regions formed in the valleys and configured to reduce the amount of distortion in the transmitted light.

17. The method of claim 16, wherein the first transparent medium and the ion-diffused regions formed therein define an optical path for the transmitted light that is $½\lambda$, or less.

18. An anti-glare light-transmitting structure comprising:
a first transparent medium having a first refractive index $n_1$ and a light-scattering first surface; and
a second transparent medium having a second refractive index $n_2$ and a second surface that defines an interface to an ambient environment having a refractive index $n_3$, wherein $n_2 > n_1 > n_3$,
wherein the second transparent medium resides atop of and at least partially covers the first surface to reduce the amount of distortion introduced by the first surface; and
wherein the light-scattering first surface includes peaks and valleys, and wherein the second transparent medium resides only in the valleys.

* * * * *